(12) United States Patent
Ng et al.

(10) Patent No.: US 12,454,675 B2
(45) Date of Patent: Oct. 28, 2025

(54) METHOD OF INCREASING PROTEIN YIELD IN MAMMALIAN CELLS IN SERUM-FREE CULTURE MEDIUM

(71) Applicant: AGENCY FOR SCIENCE, TECHNOLOGY AND RESEARCH, Singapore (SG)

(72) Inventors: Say Kong Ng, Singapore (SG); Sow Zong Dawn Leong, Singapore (SG); Gek Ling Janice Tan, Singapore (SG); Kah Hui Brian Teo, Singapore (SG)

(73) Assignee: AGENCY FOR SCIENCE, TECHNOLOGY AND RESEARCH, Singapore (SG)

(*) Notice: Subject to any disclaimer, the term of this patent is extended or adjusted under 35 U.S.C. 154(b) by 0 days.

(21) Appl. No.: 17/534,399

(22) Filed: Nov. 23, 2021

(65) Prior Publication Data
US 2022/0154137 A1 May 19, 2022

Related U.S. Application Data

(63) Continuation of application No. 16/079,070, filed as application No. PCT/SG2017/050079 on Feb. 22, 2017, now abandoned.

(30) Foreign Application Priority Data

Feb. 22, 2016 (SG) .......................... 10201601284Y

(51) Int. Cl.
C12N 5/00 (2006.01)
(52) U.S. Cl.
CPC .......... *C12N 5/0037* (2013.01); *C12N 5/0031* (2013.01); *C12N 2500/34* (2013.01); *C12N 2500/90* (2013.01)
(58) Field of Classification Search
None
See application file for complete search history.

(56) References Cited

U.S. PATENT DOCUMENTS

| | | | |
|---|---|---|---|
| 4,801,545 A | 1/1989 | Stuart et al. | |
| 5,187,092 A | 2/1993 | Uddin | |
| 5,316,938 A | 5/1994 | Keen et al. | |
| 5,563,061 A | 10/1996 | Gupta | |
| 6,048,728 A | 4/2000 | Inlow et al. | |
| 10,119,118 B2* | 11/2018 | Pla .................... | C07K 16/2869 |
| 2006/0141447 A1 | 6/2006 | Block | |
| 2014/0356910 A1 | 12/2014 | Huang et al. | |
| 2015/0259425 A1 | 9/2015 | Varma et al. | |
| 2022/0154137 A1* | 5/2022 | Ng ...................... | C12N 5/0037 |
| 2022/0315966 A1* | 10/2022 | Takenaka ............. | C12P 13/12 |

FOREIGN PATENT DOCUMENTS

| | | |
|---|---|---|
| CN | 101988047 | 3/2011 |
| CN | 104593316 | 5/2015 |
| EP | 0249772 | 12/1987 |
| EP | 0513738 A2 | 11/1992 |
| WO | 2015/066631 | 5/2015 |

OTHER PUBLICATIONS

Leong et al. (Scientific Reports, 2017, vol. 8,pp. 1-12).*
Rheinwald et al. (Cell, vol. 2, pp. 287-293, 1974).*
Leong, et al., "Application of maltose as energy source in protein-free CHO-K1 culture to improve the production of recombinant monoclonal antibody," Scientific Reports, 2018, 12 pages, Nature.
International Search Report and Written Opinion of the International Searching Authority for International Application No. PCT/SG2017/050079, 5 pages, May 22, 2017.
Altamirano et al., "Improvement of CHO cell culture medium formulation: simultaneous substitution of glucose and glutamine," Biotechnol Prog., vol. 16, No. 1, pp. 69-75, 2000.
Blackburn et al., "A chemically defined medium for the cultivation of nematophagous hyphomycetes," Transactions of the British Mycological Society, vol. 46, No. 3, pp. 449-452, 1963.
Bresseleers et al., "Measurement of the glucose permeation rate across phospholipid bilayers using small unilamellar vesicles. Effect of membrane composition and temperature," Biochim Biophys Acta., vol. 772, No. 3, pp. 374-382, 1984.
Chan et al., "Inactivation of GDP-fucose transporter gene (Sic35c1) in CHO cells by ZFNs, TALENs and CRISPR-Cas9 for production of fucosefree antibodies," Biotechnol J., vol. 11, No. 3, pp. 399-414, 2015.
Hassell et al., "Growth inhibition in animal cell culture. The effect of lactate and ammonia," Appl Biochem Biotechnol., vol. 30, pp. 29-41, 1991.
Hayashi, I., "Replacement of serum by hormones permits growth of cells in a defined medium." Nature, vol. 259, pp. 132-134, 1976.
Ho et al., "IRES-mediated Tricistronic vectors for enhancing generation of high monoclonal antibody expressing CHO cell lines." J. Biotechnol., vol. 157, pp. 130-139, 2012.
Jones et al., "Sugar Transport across Animal Membranes: The human erythrocyte monosaccharide transporter in bilayer lipid membranes," Biochem. Soc. Trans., vol. 10, pp. 5-6, 1982.
Kurano, N., et al., "Growth behavior of Chinese hamster ovary cells in a compact loop bioreactor: 1. Effects of physical and chemical environments," J. Biotechnol., vol. 15, Issues 1-2, pp. 101-111, 1990.
Lao et al., "Effects of ammonium and lactate on growth and metabolism of a recombinant Chinese hamster ovary cell culture." Biotechnol Prog., vol. 13, No. 5, 688-91, 1997.
Lauber et al., Rapid Preparation of Released N-Glycans for HILIC Analysis Using a Labeling Reagent that Facilitates Sensitive Fluorescence and ESI-MS Detection. Anal. Chem., vol. 87, pp. 5401-5409, 2015.

(Continued)

*Primary Examiner* — Hope A Robinson
(74) *Attorney, Agent, or Firm* — Womble Bond Dickinson (US) LLP

(57) ABSTRACT

The present invention provides a method of growing and/or culturing mammalian cells, such as CHO or HEK293, in a serum-free cell culture medium that contains maltose as the sole carbohydrate source, or contains maltose and at least one other saccharide. In a preferred embodiment, the additional saccharide is a monosaccharide, for example, glucose and the medium comprises DMEM-F12.

15 Claims, 13 Drawing Sheets

(56) References Cited

OTHER PUBLICATIONS

Lodish, H.B.A., et al. "Molecular Cell Biology." 4th edition (2000) Media Connected—W.H. Freeman and Company. Entire book—ISBN-10: 0716731363, 2000.
Meyer, H. et al., "Identification of an animal sucrose transporter." J. Cell. Sci., vol. 124, No. 12, pp. 1984-1991, 2011.
Scannell et al., "The regulation of carbohydrate metabolism in animal cells growth on starch and maltose," Biochem Soc Trans. vol. 8, No. 5, pp. 633-634, 1980.
Scannell et al., "The regulation of carbohydrate metabolism in animal cells: isolation of starch-and maltose-utilizing variants," Biosci Rep, vol. 2, No. 2, pp. 99-106, 1982.
Griffin, "Fermentation of synthetic media containing glucose and maltose by brewer's yeast," Journal of the Institute of Brewing, vol. 76, No. 1, pp. 45-47, 1970.
Leong et al., "Evaluation and use of disaccharides as energy source in protein-free mammalian cell cultures," So Rep, vol. 7, pp. 1-10, 2017.
Morgan et al., "Carbohydrate metabolism in cultured animal cells," Biosci Reports 1, Leicester, UK, pp. 669-686, 1981.
Mueckler et al., "The SLC2 (Glut) family of membrane transporters," Mol. Aspects Med., vol. 34, pp. 121-138, 2013.
Okabe, "Long-term cultivation and differentiation of human erythroleukemia cells in a protein-free chemically defined medium," Proc. Nat'l. Acad. Sci., vol. 81, pp. 453-455, 1984.
Ozturk, "Effect of medium osmolarity on hybridoma growth, metabolism, and antibody production." Biotechnol, Bioeng, vol. 37, pp. 989-993, 1991.
Selvarasu et al., "Combined in silico modeling and metabolomics analysis to characterize fed-batch CHO cell culture," Biotechnol. Bioeng. vol. 109, pp. 1415-1429, 2012.
Sinacore, "Adaptation of mammalian cells to growth in serumfree media." Mol. Biotechnol., vol. 15, pp. 249-257, 2000.
Thorens, "Glucose transporters in the regulation of intestinal, renal, and liver glucose fluxes." Am. J. Physiol., vol. 270, pp. G541-553, 1996.
Warburg, "On the origin of cancer cells." Science, vol. 123, pp. 309-314, 1956.
Wood et al., "Glucose permeability of lipid bilayer membranes." Biochim. Biophys. Acta., vol. 163, pp. 171-178, 1968.
Wright et al., "'Active' sugar transport in eukaryotes." J. Exp. Biol., vol. 196, pp. 197-212, 1994.
Wright, "Glucose transport families SLC5 and SLC50," Mol. Aspects Med., vol. 34, pp. 183-196, 2013.
Wong et al., "Impact of dynamic online fedbatch strategies on metabolism, productivity and N-glycosylation quality in CHO cell cultures," Biotechnol. Bioeng., vol. 89, pp. 164-177, 2005.
International Preliminary Report on Patentability for International Application No. PCT/SG2017/050079 dated Aug. 28, 2018, 8 pages.
Restriction Requirement for U.S. Appl. No. 16/079,070, mailed Sep. 27, 2019, 5 pages.
Non-Final Office Action for U.S. Appl. No. 16/079,070, mailed Aug. 23, 2021, 16 pages.
Non-Final Office Action for U.S. Appl. No. 16/079,070, mailed Jan. 29, 2020, 9 pages.
Final Office Action for U.S. Appl. No. 16/079,070, mailed Jan. 13, 2021, 15 pages.
Notice of Abandonment for U.S. Appl. No. 16/079,070, mailed Mar. 17, 2022, 2 pages.

\* cited by examiner

METHOD OF INCREASING PROTEIN YIELD IN MAMMALIAN CELLS IN SERUM-FREE CULTURE MEDIUM

CROSS-REFERENCE TO RELATED APPLICATIONS

This patent application is a continuation of U.S. application Ser. No. 16/079,070, filed Aug. 22, 2018, which is a U.S. National Phase application under 35 U.S.C. § 371 of International Application No. PCT/SG2017/050079, filed 22 Feb. 2017, entitled CELL CULTURE MEDIUM, which claims the benefit of priority of Singapore patent application No. 10201601284Y, filed 22 Feb. 2016, the contents of which were incorporated by reference.

FIELD OF THE INVENTION

The present invention relates to compositions for propagation, preservation, or maintenance of cells. In particular, the present invention relates to culture media. The present invention also relates to compositions for supporting protein production by cultured cells.

BACKGROUND OF THE INVENTION

From the first day of its inception, cell culture medium has progressively been improved and researched depending on the intention of the culture. The first few cell culture solution provides irrigation, supply of water, inorganic anions required for cell metabolism, osmotic balance, a buffering system, and a carbohydrate source for growth.

As research into how cells function improves, cell culture medium has evolved to include multitude of components, which may be included depending on the purpose of the medium. However, one that remains a constant for cells (such as mammalian cells) are the provision of glucose as a carbohydrate source.

As such, there is a need to provide cell culture medium that provides alternative carbohydrate source. The potential use of alternative carbohydrate source, as energy source can have practical implications in biopharmaceutical manufacturing. In particular, the potential use of alternative carbohydrate source may lead to the improvement of carbohydrate loading in the batch culture medium, and possibly lead to the decrease lactate accumulation which may become toxic to cells.

Accordingly, there is a need to provide a cell culture medium that has an alternative carbohydrate source.

SUMMARY OF THE INVENTION

In first aspect, there is provided a serum-free cell culture medium. The cell culture medium comprises maltose as sole carbohydrate source.

In second aspect, there is provided a serum-free cell culture medium comprising maltose and at least one, at least two, at least three or more saccharides as carbohydrate sources.

In third aspect, there is provided a method of growing and/or culturing a cell, wherein the method comprises growing and/or culturing a cell in the serum-free cell culture medium of the first aspect or the second aspect.

In fourth aspect, there is provided a method of growing and/or culturing a cell, wherein the method comprising growing and/or culturing a cell in the serum-free cell culture medium as described herein.

In fifth aspect, there is provided a method of increasing protein yield, wherein the method comprises growing and/or culturing a cell in the serum-free cell culture medium as described herein.

In sixth aspect, there is provided a kit comprising the components of the serum-free cell culture medium as described herein.

BRIEF DESCRIPTION OF THE DRAWINGS

The invention will be better understood with reference to the detailed description when considered in conjunction with the non-limiting examples and the accompanying drawings, in which:

FIG. 2 shows that the maltose can be used as a glucose-replacement.

FIG. 3 shows that cells can switch to maltose metabolism upon glucose depletion, to sustain cell growth and protein production.

FIG. 4 shows that cells cultured utilises maltose and that maltose hydrolysis was not occurring spontaneously in the conditioned culture media, even when culture viabilities were low.

FIG. 5 shows similar cell growth in cultures with 10 g/l maltose supplement or 20 g/l maltose supplement, as compared with 14 g/l glucose, thus shows that maltose metabolism rate at higher maltose supplement concentration provides ample support to cell growth. This allows for lower initial glucose concentrations in the cultures, leading to lactate consumption in the cell cultures with maltose supplement, as compared to the culture with 14 g/l glucose. Additionally, osmolality is much lower than the culture with 20 g/l glucose, which removes the osmolality limitation on carbohydrate loading in cell culture media. Additionally, FIG. 5 also demonstrates an improvement in maximum recombinant protein production (i.e. IgG titer) in maltose supplemented culture.

FIG. 6 shows a new estimate of mammalian cell maltose metabolism kinetics.

FIG. 7 shows that the presence of maltose enables the use of a lower glucose feed that can result in higher maximum recombinant protein production (i.e. IgG titers).

FIG. 8 shows that maltose supplementation can be used as a means to fine-tune protein co-translational or post-translational modification processes (such as in monoclonal antibody glycosylation profile, especially in marginally reducing the sialylation level, which is known to improve antibody-dependent cellular cytotoxicity (ADCC) of therapeutic antibodies).

FIG. 9 shows maltose supplementation in the feed medium can decreased the lactate concentration marginally when compared to the culture with glucose only feed. This feature will be advantageous in cultures whereby lactate build-up is causing the culture to crash. FIG. 9 also shows that the addition of maltose in the feed medium can maintain a higher maltose concentration in the culture with no adverse effect on cell growth and recombinant protein production.

FIG. 10 shows that the CHO-K1 cells can grow faster in PFCDM with 20 g/l or more maltose as the only carbohydrate in the medium. Even with the higher maltose concentration, lactate concentration was kept at a low level till viability started to drop on Day 6. This supports the findings described in FIG. 2, which demonstrates that maltose can be used as a glucose-replacement in the absence of serum and hydrolysates in routine cultivation of cells (such as mammalian cells), with the additional advantage of low lactate accumulation.

FIG. 13 shows that the use of a lower glucose feed alone without maltose supplementation results in a lower cell growth profile and recombinant protein production (i.e. IgG titer). This supports the results in FIG. 7, and confirms that the presence of maltose enabled the use of a lower glucose feed that can result in the observed higher cell production yield (i.e. higher maximum IgG titers).

DETAILED DESCRIPTION OF THE PRESENT INVENTION

Figure 1:
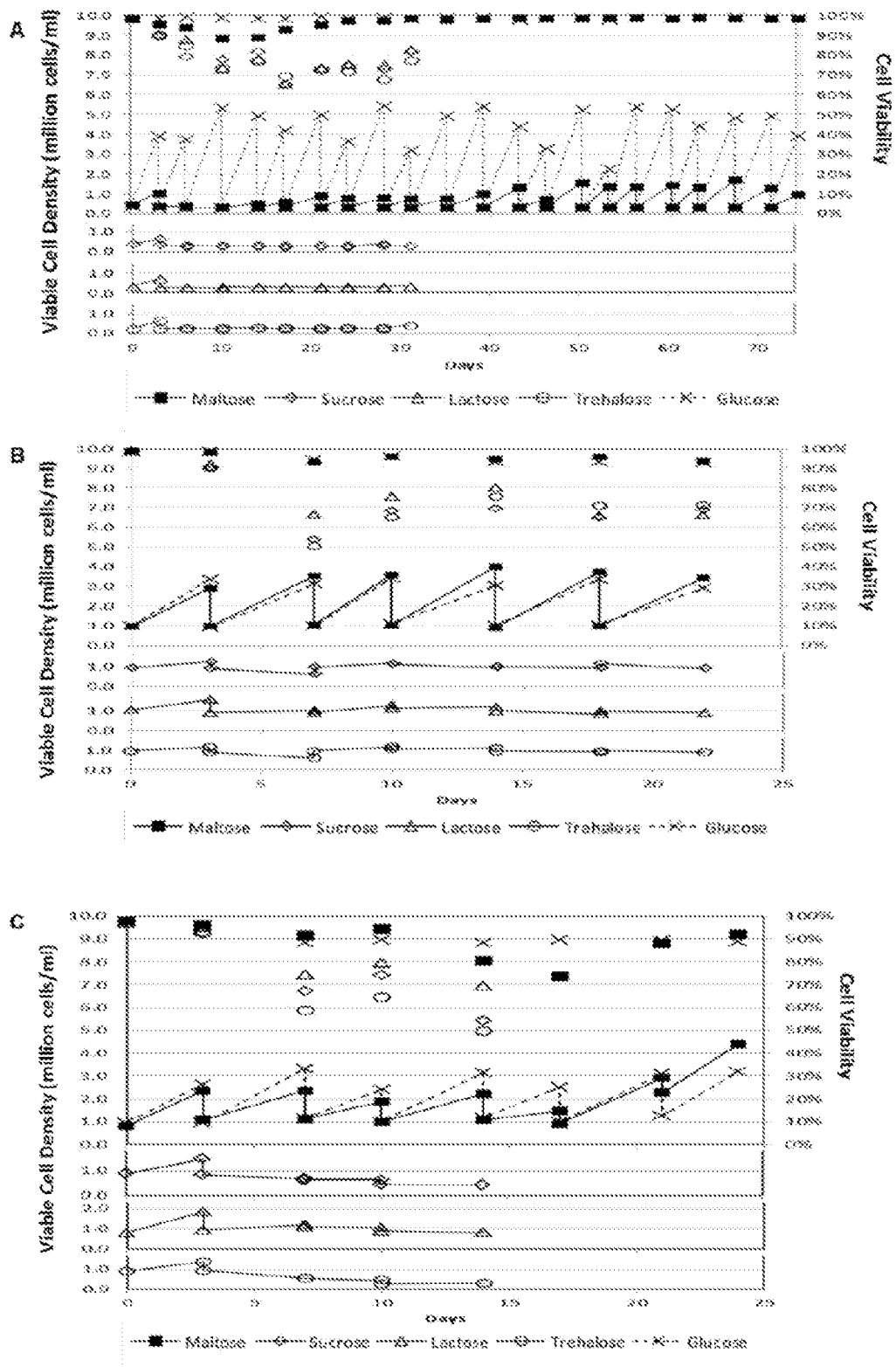
FIG. 1 shows the results of adaptability tests of Chinese Hamster Ovary (CHO) cells in various disaccharide media. In (A) CHO-K1 cells were cultivated in a serum-free protein-free cell culture medium, HyQ PF-CHO, with 3.6 g/l of different sugars (maltose, sucrose, lactose, trehalose or glucose) as carbohydrate source. The viable cell densities (lined markers) and culture viabilities (marker only) of these cultures at the beginning and end of each passage over a period of 74 days were plotted. Cultures with sucrose, lactose or trehalose were terminated on Day 31 due to the decreased culture viabilities and reduced viable cell densities. The experiment was repeated with a seeding cell density of $1.0 \times 10^6$ cells/ml to obtain similar results. In (B) CHO-DG44 cells were cultivated with a seeding cell density of $1.0 \times 10^6$ cells/ml in a serum-free protein-free cell culture medium, HyQ PF-CHO, with 10 g/l of different sugars (maltose, sucrose, lactose, trehalose or glucose) as carbohydrate source. The viable cell densities (lined markers) and cell viabilities (marker only) of these cultures at the beginning and end of each passage over a period of 22 days were plotted. In (C) HEK293 cells were cultivated with a seeding cell density of $1.0 \times 10^6$ cells/ml in a protein-free chemically defined cell culture medium, PFCDM, with 10 g/l of different sugars (maltose, sucrose, lactose, trehalose or glucose) as carbohydrate source. The viable cell densities (lined markers) and cell viabilities (marker only) of these cultures at the beginning and end of each passage over a period of 22 days were plotted. Cultures with sucrose, lactose or trehalose were terminated on Day 14 due to the decreased culture viabilities and reduced viable cell densities. Therefore, FIG. 1 demonstrates that CHO-K1, CHO-DG44 and HEK293 cells can proliferate in serum-free culture medium utilizing maltose, but not sucrose, lactose or trehalose, as sugar source.

Most cultured cells (such as mammalian cells) are chemoheterotrophic and typically require a carbohydrate source for growth in cultures. As carbohydrates have low permeability through the phospholipid bilayer that makes the bulk of the cell membrane (Bresseleers et al., 1984; Wood et al., 1968), sugar transport into the cell is facilitated by transporter proteins (Jones and Nickson, 1982; Thorens, 1996; Wright et al., 1994). Hence, for the cultivation of cells (such as mammalian cells), glucose is the single most commonly used carbohydrate, because it can be efficiently transported into the cells through two major families of monosaccharide transporters, the sodium-glucose linked transporters (SGLT) (Wright et al., 1994) and glucose transporters (GLUT).

In addition to glucose, other carbohydrate sources have been tested for their ability to support growth of animal cell cultures (Altamirano et al., 2000; Morgan and Faik, 1981). In these reports, monosaccharides galactose, fructose and mannose were demonstrated to be utilized by most cell types in both serum and serum-free culture media, consistent with the availability of transporter proteins to internalize these sugars (Mueckler and Thorens, 2013; Wright, 2013). Polysaccharides had also been shown to support cell growth in cell cultures supplemented with serum, because serum contains saccharidases that were essential for the breaking down of the complex carbohydrates in the culture media (Morgan and Faik, 1981). In another study, heat inactivated serum devoid of amylase and/or maltase activities and culture dishes coated with serum-containing medium were used to isolate Chinese Hamster Ovary (CHO) cell variants that can utilize maltose or starch (Scannell and Morgan, 1982). The authors showed that the culture dish coated with serum-containing medium did not contribute to saccharidase activity, and thus they hypothesized that endogenous carbohydrate hydrolases, otherwise only expressed in the small intestines, were induced in these isolates to allow for their growth in maltose and starch-containing media (Scannell and Morgan, 1982). Nonetheless, saccharidase-containing serum was used in this study to coat the culture dishes, and how this contributed to cell utilization of maltose and starch was not evaluated.

In this study, the use of disaccharides to support the growth of a mammalian Chinese Hamster Ovary (CHO) cell line was evaluated, CHO-K1, in a serum-free protein-free culture. CHO-K1 cells was found to be capable of utilizing maltose for growth in the absence of glucose. Using a production CHO-K1 cell line producing a recombinant monoclonal antibody, these cells were shown to be capable of utilizing maltose after glucose depletion in a biphasic manner, when culture media with both glucose and maltose were used. In addition, it was demonstrated that maltose was internalized by the cells and did not hydrolyze spontaneously in the conditioned culture media. Maltose supplementation also led to a 15% improvement in the cell protein production (i.e. recombinant monoclonal antibody titer from batch culture). The specific maltose consumption rates were then determined and fitted in a Monod model to obtain a maximum specific maltose consumption rate (qs_max) of 0.257 ng/cell/day and an affinity constant (Ks) of 7.03 g/l. The application of maltose supplementation in fed-batch bioreactor cultures were then demonstrated to result in 23% and 55% improvements in maximum monoclonal antibody titers and specific monoclonal antibody productivities respectively, when compared to glucose-only fed-batch cultures. Hence, maltose supplementation may be applied as a simple bioreactor process modification to improve cell protein production (such as monoclonal antibody) yields in current manufacturing processes.

The inventors of the present disclosure surprisingly found that there is no report to-date on the use of polysaccharides to support cell growth in serum-free cultivation of cells (such as mammalian cells), even though serum-free and protein free cultivation of mammalian cells has been reported since the 1970s and 1980s respectively (Hayashi and Sato, 1976; Okabe et al., 1984). This is not surprising, since there is only one known animal disaccharide sucrose transporter that was recently reported (Meyer et al., 2011). Whether polysaccharides can support mammalian cell growth in serum-free culture is of interest for both basic and applied sciences. For the basic understanding of mammalian cell metabolism of polysaccharides, the use of serum-free culture can completely preclude the role of saccharidase from serum contributing to the survival of cells utilizing only polysaccharides, which could not be ruled out in the previous report (Scannell and Morgan, 1982). If a serum free mammalian cell culture utilizing polysaccharides is obtained, the culture can be a model to elucidate yet unknown mechanisms of polysaccharide transport and metabolism in mammalian cells, such as the recent discovery of the first known animal sucrose transporter in *Drosophila melanogaster* (Meyer et al., 2011).

For practical applications, the use of polysaccharides for mammalian cell cultivation can give advantages to the serum free suspension cell culture of transformed cell lines typically used or the biomanufacturing of recombinant protein therapeutics. Two glucose-related issues are commonly encountered for such cell cultures: Firstly, glucose is commonly the limiting substrate in serum-free suspension cell batch culture due its high consumption rate and the high cell density attained in suspension cell cultures. This is despite the high initial glucose concentration in the culture media, as glucose is commonly the most abundant nutrient in most media formulations for mammalian cell batch culture (Sinacore et al., 2000), at 2 to 10 fold higher concentration than the next most abundant nutrient utilized by the cells during cell growth. Further loading of the cell culture media with glucose is limited by the overall osmolality of the culture media since hyperosmotic culture media has been shown to be detrimental to cell growth (Kurano et al., 1990; Ozturk and Palsson, 1991). Secondly, glucose is known to contribute to high lactate levels in culture, since these transformed cell lines have high rates of glycolysis and lactate production, a phenotype described as the Warburg effect (Warburg, 1956). This becomes a productivity limitation to both batch and fed-batch cultures, because lactate is toxic to the cells and increased lactate concentrations in the bioreactor will result in decreased cell growth rate (Hassell et al., 1991; Lao and Toth, 1997).

The inventors of the present disclosure, thus, hypothesised that the use of polysaccharides in serum free suspension cell culture may potentially address both issues: As polysaccharides contribute to lower osmolality per unit mass concentration, these sugars can potentially increase the sugar availability to cells in batch culture media since higher mass concentrations can be used. Depending on the rate of conversion of the polysaccharides to monosaccharides, it may also mitigate lactate accumulation in the bioreactor by providing a source of sugars that is not readily available to the cells, thereby limiting glycolysis and lactate production. In theory, this will be somewhat similar to maintaining low glucose concentrations in bioreactors as achieved by dynamic online feeding strategies (Wong et al., 2005), albeit being practically simpler to setup and implement.

In view of the above, in the present disclosure, the use of disaccharides, the simplest polysaccharides, to support the growth of a mammalian cell line in a serum-free protein-free culture is described. Therefore, in a first aspect, the present invention refers to a serum-free cell culture medium comprising maltose as sole carbohydrate source. In another aspect, the present invention refers to serum-free cell culture medium comprising maltose and at least one additional, at least two additional, at least three additional or more additional saccharides as carbohydrate sources.

As illustrated in the Experimental Section below, the inventors of the present disclosure surprisingly demonstrated the successful use of maltose as a carbohydrate source in mammalian cell cultivation. It is surprisingly shown that animal cells are able to utilize disaccharides. The result was surprising because mammalian cells are not known to express disaccharide transporters, and only selected mammalian cells (such as intestinal cells) expresses maltases on its cell membrane to allow the digestion of maltose.

As used herein, the term "serum-free" refers to a cell culture medium that is devoid of fetal calf serum (FCS) or fetal bovine serum (FBS) or new-born calf serum (NBS), or serum from any other human or animal origin. As illustrated or demonstrated in the Experimental Section below, the inventors of the present inventors were able to use maltose as a carbohydrate source in serum free cultures. The use of maltose as carbohydrate source in the present disclosure is in contrast with the uses known in the art where maltose are generally used as a carbohydrate source for cell (mammalian cell) cultivation in serum containing media. The reason for the use of maltose for cell (mammalian cell) cultivation in serum containing media is because serum has been shown to contain maltases, which will break down maltose to glucose in vitro prior to metabolism by the cells. The inventors of the present disclosure developed the surprising use of disaccharides as a source of carbohydrate for serum-free cell culture (such as animal cell culture). Furthermore, it is also surprisingly shown that cells (such as mammalian cells) can be routinely cultivated in maltose containing media in the absence of glucose, as they can in glucose containing media.

The advantage of using maltose in serum free cell culture (such as mammalian cell culture) is that it can be added to cell culture media with less osmolality load, since it is a disaccharide. Hence, more carbohydrate can be loaded to the culture media compared to a monosaccharide such as glucose. In addition, as demonstrated herewith, the use of maltose in a batch culture medium can result in lowered lactate accumulation, which is also known to be detrimental to cell cultivation. It has also been demonstrated in the present disclosure that the use of maltose in batch and fed-batch culture can improve protein (such as recombinant protein or recombinant monoclonal antibody) production.

In some examples, the cell culture as described herein may provide carbohydrate source that may solely be maltose. In some examples, the cell culture as described herein may provide carbohydate source that may have at least one additional (i.e. maltose plus at least one more), or at least two, or at least three, or at least four, or at least five, or at least six, or at least seven, or at least eight, or more saccharide(s). As described in the Experimental Section below, the batch culture media were loaded with saccharides, such that carbohydrates are no longer limiting. Thus, in some examples, the saccharide may be, independently, or in combination with one another, present at a concentration of between 0.5 g/litre to 40 g/litre, between 10 g/litre to 15 g/litre, between 15 g/litre to 20 g/litre, between 20 g/litre to 25 g/litre, between 25 g/litre to 30 g/litre, between 30 g/litre to 35 g/litre, between 35 g/litre to 40 g/litre, at least about 1 g/litre, at least about 2 g/litre, at least about 3 g/litre, at least about 4 g/litre, at least about 5 g/litre, at least about 8 g/litre, at least about 10 g/litre, at least about 15 g/litre, at least about 20 g/litre, at least about 25 g/litre, at least about 30 g/litre, at least about 35 g/litre, about 1.5 g/litre, about 3.5 g/litre, about 3.6 g/litre, about 5.5 g/litre, about 8 g/litre, about 11 g/litre, about 14 g/litre, about 18 g/litre, about 23 g/litre, about 28 g/litre, about 33 g/litre, or about 38 g/litre.

In some examples, the saccharide as described herein may be a polysaccharide. The polysaccharide as described herein may be a glucan or a disaccharide.

As used herein, the term "glucan" refers to a polysaccharide that is a polymer made up of D-glucose monomers linked together by glycosidic bonds. In some examples, the glucan as described herein may include, but is not limited to, cellobiose, kojibiose, nigerose, isomaltose, β,β-trehalose, α,β-trehalose, sophorose, laminaribiose, gentiobiose, dextran, glycogen, pullulan, starch, cellulose, chrysolaminarin, curdlan, laminarin, lentinan, lichenin, oat beta-glucan, pleuran, zymosan, and combinations thereof.

In some examples, the "disaccharide" as described herein may include, but is not limited to, cellobiose, chitobiose, kojibiose, nigerose, isomaltose, β,β-trehalose, α,β-trehalose, sophorose, laminaribiose, gentiobiose, turanose, maltulose, palatinose, gentiobiulose, mannobiose, melibiose, melibiulose, rutinose, rutinulose, xylobiose and combinations thereof.

In some examples, the saccharide as described herein may be components of undefined cell culture supplements including, but is not limited to, soy hydrolysates, yeastolates, lactalbumin hydrolysates, casein hydrolysates, gelatin hydrolysates, gluten hydrolysates, liver hydrolysates, vegetable hydrolysates, wheat hydrolysates, peptone from animal tissues, tryptose, protein peptones and combinations thereof.

In some examples, the saccharide as described herein may be monosaccharide. As used herein, the term "monosaccharide" refers to any of a class of carbohydrates that cannot be broken down to simpler sugars by hydrolysis and that constitute the building blocks of oligosaccharides and polysaccharides. Monosaccharides may have at least three carbon atoms, one of which is attached to an oxygen atom to form an aldehyde group (CHO) or a ketone, and the others of which are each attached to a hydroxyl group (OH). A monosaccharide that comprises three carbons per molecule is referred to a triose. A monosaccharide that comprises four carbons per molecule is referred to as a tetrose. A monosaccharide that comprises five carbons per molecule is referred to as a pentose. A monosaccharide sugar containing six carbons per molecule is referred to as a hexose. Monosaccharides can occur as chains or rings. Monosaccharides may include, but is not limited to, tagatose, glucose, galactose, ribose, fructose and xylose. As shown in the experimental section, when maltose is used, improvement in protein titer was observed. Thus, in some example, the monosaccharide may be glucose. As shown in the Experimental section of the present disclosure, in some examples, the culture medium as described herein may comprise glucose with additional maltose supplement. Thus, in some example, the cell culture medium as described herein may comprise maltose and glucose as sole carbohydrate sources. As demonstrated in the Experimental Section below, using maltose in cell culture (such as fed-batch processes) allows the control of glucose at lower levels to improve recombinant protein production. Without wishing to be bound by theory, the combination of maltose and glucose as sole carbohydrate sources may reduce the risk of complete carbohydrate depletion that can cause the culture to die off (crash).

As described in the Experimental Section below, the batch culture media were loaded with maltose, such that carbohydrates are no longer limiting. Thus, in some examples, the maltose may be present in the culture medium as described herein at a concentration of between 0.5 g/litre to 40 g/litre, between 10 g/litre to 15 g/litre, between 15 g/litre to 20 g/litre, between 20 g/litre to 25 g/litre, between 25 g/litre to 30 g/litre, between 30 g/litre to 35 g/litre, between 35 g/litre to 40 g/litre, at least about 1 g/litre, at least about 2 g/litre, at least about 3 g/litre, at least about 4 g/litre, at least about 5 g/litre, at least about 8 g/litre, at least about 10 g/litre, at least about 15 g/litre, at least about 20 g/litre, at least about 25 g/litre, at least about 30 g/litre, at least about 35 g/litre, about 1.5 g/litre, about 3.5 g/litre, about 3.6 g/litre, about 5.5 g/litre, about 8 g/litre, about 11 g/litre, about 14 g/litre, about 18 g/litre, about 23 g/litre, about 28 g/litre, about 33 g/litre, or about 38 g/litre.

In some examples, the serum-free cell culture medium as described herein may be protein-free. As used herein, the term "protein-free" refers to a cell culture medium that is devoid of insulin or transferrin or growth factors or any proteins purified from any organisms or any recombinant proteins. For clarity, hydrolysates or hydrolysed proteins may be present in protein-free cell culture medium. As serum contains proteins, all protein-free media are also serum-free.

In some examples, the serum-free cell culture medium as described herein may be a chemically defined medium. As used herein the term "chemically defined" refers to a growth medium suitable for the in vitro cell culture of cells in which all of the chemical components are identified and their exact concentrations known. A chemically defined medium must also be entirely free of any undefined components such as fetal bovine serum or serum from any other human or animal origin, or soy hydrolysate, yeast hydrolysate or any hydrolysates wherein the exact identity and concentrations of components are not known. This means that a chemically defined media can contain recombinant versions of proteins, such as but not limited to, albumin and growth factors, usually derived from rice or E. coli. As serum contains undefined components, all chemically defined media are also serum-free.

In some examples, the serum-free cell culture medium as described herein may be a protein-free chemically defined medium (PFCDM). As used herein the term "protein-free chemically defined" refers to a growth medium suitable for the in vitro cell culture of cells in which all of the chemical components are known, and is devoid of insulin or transferrin or growth factors or any proteins purified from any organisms or any recombinant proteins.

As illustrated throughout the Experimental Section below, the cell culture medium as described herein may further include, but is not limited to, a basal cell culture medium selected from the group consisting of basal medium eagle (BME), Eagle's minimum essential medium (MEM or Eagle's MEM), Earle's balanced salt solution (EBSS), Dulbecco's modified Eagle's medium (DMEM), HAM's F-10 medium, HAM's F-12 medium, DMEM-F12 medium, Roswell Park Memorial Institute 1640 (RPMI 1640 or RPMI), Leiboitz's medium (L-15-medium), combinations thereof or modified versions thereof. In some examples, the cell culture medium as described herein may include Iscove's Modified Dulbecco's Medium (IMDM); IMDM with HEPES and L-Glutamine; IMDM with HEPES and without L-Glutamine; RPMI 1640 with L-Glutamine; RPMI 1640 with HEPES, L-Glutamine and/or Penicillin-Streptomycin; Minimal Essential Medium-alpha (MEM-alpha); DMEM:F12 1:1 with L-Glutamine; DME/F12; Basal Medium Eagle with Earle's BSS; GMEM (Glasgow's MEM); GMEM with L-glutamine; F-10; F-12; Ham's F-10 with L-Glutamine; Ham's F-12 with L-Glutamine; L-15 (Leibovitz) (2×) without L-Glutamine or Phenol Red; L-15 (Leibovitz) without L-Glutamine; McCoy's 5A Modified Medium; Medium 199; MEM Eagle without L-Glutamine or Phenol Red (2×); MEM Eagle-Earle's BSS with L-glutamine; MEM Eagle-Earle's BSS without L-Glutamine; MEM Eagle-Hanks BSS without L-Glutamine; NCTC-109 with L-Glutamine; Richter's CM Medium with L-Glutamine; and hydrolysate-containing media.

Furthermore, depending on the cells to be cultured, it is believed to be advantageous if the cell culture medium as described herein may further comprise at least one additional ingredient that includes, but is not limited to, at least one amino acid, at least one vitamin, at least one inorganic salt, at least one trace element, adenine sulfate, ATP, deoxyribose, ethanolamine, ethanolamine.HCl, glutathione, N-(2-hydroxyethyl)piperazine-N'-(2-ethanesulfonic acid) (HEPES), hypoxanthine, linoleic acid, lipoic acid, phenol red, phosphoethanolamine, putrescine, sodium pyruvate, cholesterol, dextran sulphate, (3-mercaptoethanol, methotrexate (MTX), methionine sulfoximine (MSX), thymidine, uracil, xanthine, combination thereof, and the like.

In some examples, the amino acid ingredient may include, but is not limited to, one or more amino acids, such as, but not limited to, L-alanine, L-arginine, L-asparagine, L-aspartic acid, L-cystine, L-cysteine, L-glutamic acid, L-glutamine, glycine, L histidine, L-isoleucine, L-leucine, L-lysine, L-methionine, L-phenylalanine, L proline, L-serine, L-threonine, L-tryptophan, L-tyrosine, L-valine, and the like or combinations thereof.

The vitamin ingredient as described herein may include, but is not limited to, one or more vitamins, such as, ascorbic acid, biotin, choline chloride, D-Ca++-pantothenate, folic acid, 1-inositol, menadione, niacinamide, nicotinic acid, paraaminobenzoic acid (PABA), pyridoxal, pyridoxine, riboflavin, thiamine, vitamin A acetate, vitamin B12, vitamin D2, and the like or combinations thereof.

The inorganic salt ingredient as described herein may include, but is not limited to one or more inorganic salts such as, $CaCl_2$, KCl, $MgCl_2$, $MgSO_4$, NaCl, $NaHCO_3$, $Na_2HPO_4$, $NaH_2PO_4$, $KH_2PO_4$, $Ba(C_2H_3O_2)_2$, KBr, $CoCl_2$, KI, $MnCl_2$, $Cr(SO_4)_3$, $CuSO_4$, $NiSO_4$, $H_2SeO_3$, $NaVO_3$, $TiCl_4$, $GeO_2$, $(NH_4)_6Mo_7O_{24}$, $Na_2SiO_3$, $FeSO_4$, NaF, $AgNO_3$, RbCl, $SnCl_2$, $ZrOCl_2$, $CdSO_2$, $ZnSO_4$, $Fe(NO_3)_3$, $AlCl_3$, ferric citrate chelate, and the like or combinations thereof.

The trace element ingredient as described herein may include, but is not limited to an ion of one or more trace elements such as barium, bromine, cobalt, iodine, manganese, chromium, copper, nickel, selenium, vanadium, titanium, germanium, molybdenum, silicon, iron, fluorine, silver, rubidium, tin, zirconium, cadmium, zinc, aluminium, and the like or combinations thereof.

It is also envisaged that the cell culture medium as described herein may be further combined with at least one, or at least two, or at least all of ingredients such as a hydrolysate, or an enzymatic digest, or yeast cell extract.

In some examples, the cell culture medium as described herein may be further combined with any one or more of a zwitterionic surfactant, an ionic surfactant or a non-ionic surfactant. Suitable surfactants may be ionic surfactants, which may either be an anionic surfactant or a cationic surfactant. Anionic surfactants have a negative ionic group, either based on a permanent anion such as sulphate, sulfonate or phosphate, or on a pH-dependent anion such as carboxylate. Examples of anionic surfactants includes, but is not limited to, alkyl sulfates, alkyl sulfonates, alkyl ether sulfates, alkyl phosphates, alkyl phosphonates, docusates, sulfonate fluorosurfactants, alkyl benzene sulfonates, alkyl aryl ether phosphates, alkyl ether phosphates, alkyl carboxylates, alkyl polyoxyethylene sulfates, carboxylate fluorosurfactants, ammonium lauryl sulfate, sodium dodecyl sulfate (SDS), dioctyl sodium sulfosuccinate, sodium deoxycholate, sodium alginate, sodium-n-dodecylbenzenesulfonate, sodium lauryl sulfate, sodium lauryl ether sulfate (SLES), sodium myreth sulfate, dioctyl sodium sulfosuccinate, phosphatidyl glycerol, potassium laurate, phosphatidyl inosine, phosphatidylinositol, perfluorooctanesulfonate (PFOS), perfluorobutanesulfonate, sodium stearate, triethanolamine stearate, diphosphatidylglycerol, phosphatidylserine, phosphatidic acid and their salts, sodium carboxymethylcellulose, cholic acid and other bile acids (e.g., cholic acid, deoxycholic acid, glycocholic acid, taurocholic acid, glycodeoxycholic acid) and salts thereof (e.g., sodium deoxycholate), sodium lauroyl sarcosinate, perfluorononanoate, and perfluorooctanate (PFOA or PFO), and the like.

In some examples, the non-ionic surfactants may include, but is not limited to, glyceryl esters, polyoxyethylene fatty alcohol ethers, polyoxyethylene sorbitan fatty acid esters (polysorbates), polyoxyethylene fatty acid esters, sorbitan esters, glycerol monostearate, polyethylene glycols, polypropylene glycols, cetyl alcohol, cetostearyl alcohol, stearyl alcohol, aryl alkyl polyether alcohols, polyoxyethylene-polyoxypropylene copolymers (poloxamers), poloxamines, methylcellulose, hydroxymethyl cellulose, hydroxypropyl cellulose, hydroxypropylmethyl cellulose, noncrystalline cellulose, polysaccharides including starch and starch derivatives such as hydroxyethylstarch (HES), polyvinyl alcohol, polyvinylpyrrolidone, and the like.

Cationic surfactants comprise a positive ionic group and pH-dependent cationic surfactants are based on primary, secondary or tertiary amines, whereas permanently charged cationic surfactants are based on quaternary ammonium cation. Examples of cationic surfactants may include, but is not limited to, natural phospholipids, synthetic phospholipids, quaternary ammonium compounds, benzalkonium chloride, cetyltrimethyl ammonium bromide, chitosans, lauryl dimethyl benzyl ammonium chloride, acyl carnitine hydrochlorides, dimethyl dioctadecyl ammomium bromide (DDAB), dioleyoltrimethyl ammonium propane (DOTAP), dimyristoyl trimethyl ammonium propane (DMTAP), dimethyl amino ethane carbamoyl cholesterol (DC-Chol), 1,2-diacylglycero-3-(O-alkyl) phosphocholine, O-alkylphosphatidylcholine, alkyl pyridinium halides, or long-chain alkyl amines such as, for example, n-octylamine, oleylamine, and the like.

In some examples, the surfactant may be zwitterionic surfactants, which are electrically neutral surfactants that posseses local positive and negative charges within the same molecule. Examples of suitable zwitterionic surfactants include, but is not limited to, zwitterionic phospholipids such as phosphatidylcholine, phosphatidylethanolamine, diacyl-glycero-phosphoethanolamine (such as dimyristoyl-glycero-phosphoethanolamine (DMPE), dipalmitoyl-glycero-phosphoethanolamine (DPPE), distearoyl-glycero-phosphoethanolamine (DSPE), dioleolyl-glycero-phosphoethanolamine (DOPE)), and the like. In some examples, the culture medium as described herein may include mixtures of phospholipids that include anionic and zwitterionic phospholipids. Such mixtures include, but are not limited to lysophospholipids, egg or soybean phospholipid, or any combination thereof. The phospholipid, whether anionic, zwitterionic or a mixture of phospholipids, may be salted or desalted, hydrogenated or partially hydrogenated or natural semi-synthetic or synthetic. In some examples, the surfactant may include, but is not limited to, fatty alcohols; polyoxyethylene glycol octylphenol ethers; and polyoxyethylene glycol sorbitan alkyl esters. In other examples, the surfactant may be a non-ionic surfactant. In some examples, the surfactant may include, but is not limited to, polysorbate 80 (PS80), polysorbate 20 (PS20), and poloxamer 188 (P188).

To prevent undesired growth, it may be advantageous for the cell culture medium as described herein to comprise agent that prevents undesired growth of contaminants. Thus, in some examples, the cell culture medium as described herein may further comprise an antibiotic agent. The antibiotic agent may include, but is not limited to, hygromycin B, puromycin, blasticidin, bleomycin sulfate, geneticin (G418), zeocin, amphotericin B, ampicillin, penicillin, chloramphenicol, gentamycin, kanamycin, neomycin, streptomycin, tetracycline, polymyxin B, actinomycin D, amikacin, bacitracin, carbenicillin, ceftazidime, coumermycin A1, D-cycloserine, cyclohexamide, dihydrostreptomycin sesquisulfate, kasugamycin, mycophenolic acid, nalidixic acid, nourseothricin sulfate, oxytetraclycline, paromomycin sulfate, phleomycin, mitomycin C ribostamycin, rifampicin, rifamycin, spectinomycin, tazobactam, thiostrepton, ticarcillin, and combinations thereof.

It would be understood to the person skilled in the art that each ingredient as described herein will be present in an amount that is suitable for the cultivation of the desired cell in vitro. Thus, in one example, each ingredient of the culture medium as described herein may be present in an amount which supports the cultivation of a cell in vitro. As would be understood, it is envisaged that increasing the concentrations of other nutrients in the batch culture medium may further improve protein (such as recombinant protein) productivity.

To assist in the transportation, and/or storage of the cell culture medium as described herein, the cell culture medium as described herein may be provided as a cell culture medium concentrate. Thus, in some examples, the cell culture medium as described herein may be a 1× to a 100× medium formulation, or a 1×, or a 2×, or a 5×, or a 10×, or a 50×, or 100× medium formulation. The culture medium as described herein may be provided in powdered form or liquid form.

In some example, the cell culture medium may include, but is not limited to, Dulbecco's minimum essential medium (DMEM), F-12 basal medium (DMEM-F12), L-glutamine, a non-ionic surfactant, geneticin and maltose, or a modified version thereof.

As illustrated in the Experimental Section below, the cell culture medium may further include glucose. Therefore, in some examples, the cell culture medium may include, but is not limited to, Dulbecco's minimum essential medium (DMEM), F-12 basal medium (DMEM-F12), L-glutamine, a non-ionic surfactant, geneticin, maltose and glucose, or a modified version thereof.

Depending on the purpose of the cell culture, the cell to be cultured in the culture medium as described herein may include, but is not limited to, a vertebrate cell, an arthropod cell, an annelid cell, a molluscs cell, a sponge cell, a jellyfish cell, an insect cell, an avian cell, a mammalian cell, a fish cell, and the like.

When the cell to be cultured is an insect cell, the insect cell may be derived from *Spodoptera* spp. or *Trichoplusa* spp.

In some examples, the cell to be cultured in the culture medium as described herein may be a mammalian cell. The mammalian cell may include, but is not limited to, a human cell, a murine cell, a rat cell, a hamster cell, a rabbit cell, a dog cell, a monkey cell, a hybridoma cell, a CHO cell, a CHO-K1 cell, a CHO-DG44 cell, a CHO-S cell, a CHO-DXB11 cell, a CHO-GS cell, a SH87 cell, a BHK cell, a COS cell, a VERO cell, a HeLa cell, a 293 cell, a PER-C6 cell, a K562 cell, a MOLT-4 cell, an M1 cell, an NS-1 cell, a COS-7 cell, an MDBK cell, an MDCK cell, an MRC-5 cell, a WI-38 cell, a WEHI cell, an SP2/0 cell, a CAP cell, a AGE1.HN cell, or a derivative thereof. In some examples, the mammalian cell may be a CHO-K1 cell, or a CHO-DG44 cell, or a protein (such as recombinant protein) producing derivative thereof, such as SH87.

Advantageously, as demonstrated in the Experimental Section below, the culture medium as described herein may be used to culture any cells, without the need of any modifications to enable the metabolism of alternative carbohydrate source (such as maltose). Thus, in some examples, the cell that may be used for the cell culture medium as described herein may be able to metabolize the sole carbohydrate source or carbohydrate sources without requiring prior adaptation to said source/sources. As used herein, the term "adaptation" refers to adjusting or changing the physiology of an organism in order to be more suited to an environment. This adjustment or change can be performed, for example by genetic modification of said organism, but can also take place spontaneously through natural selection and environmental selective pressures.

In another aspect, there is provided a method of growing and/or culturing a cell, wherein the method comprises growing and/or culturing a cell in the serum-free cell culture medium as described herein. In some examples, the method may comprise growing and/or culturing a cell in the serum-free cell culture medium that may comprise maltose as sole carbohydrate source or may comprise maltose and at least one, or at least two, or at least three, or at least four, or more saccharides as carbohydrate sources. In some examples, the methods may comprise growing and/or culturing a cell as described herein, wherein the culture medium may comprise maltose and glucose as sole carbohydrate sources or the culture medium may comprise Dulbecco's minimum essential medium (DMEM), F-12 basal medium (DMEM-F12), L-glutamine, a non-ionic surfactant, geneticin, and maltose, or a modified version thereof. As shown in the Experimental Section below, the method of growing and/or culturing the cell as described herein improves protein production. Thus, in some examples, the method as described herein improves protein yield.

The method of growing and/or culturing a cell as described herein may grow cells using methods of cell culturing known in the other. In some examples, the cells as described herein may be grown and/or cultured in cultures including, but not limited to, adherent cultures, suspension cultures, T-flask cultures, spinner flask cultures, shake flask cultures, spin-tube cultures, microbioreactor cultures, bioreactor cultures, in batch cultures, in fed-batch cultures, in continuous cultures, in perfusion cultures, and the like. In some examples, the growing and/or culturing of the cell may be performed under conditions suitable for supporting growth and/or culture of the cell.

As shown in the Experimental Section, the methods as disclosed herein can increase protein yield. Thus, in another aspect, there is provided a method of increasing protein yield. The method comprises growing and/or culturing a cell in the serum-free cell culture medium as described herein. In some examples, the method may comprise growing and/or culturing a cell in the serum-free cell culture medium that may comprise maltose as sole carbohydrate source or may comprise maltose and at least one, or at least two, or at least three, or at least four, or more saccharides as carbohydrate sources. In some examples, the methods may comprise growing and/or culturing a cell as described herein, wherein the culture medium may comprise maltose and glucose as sole carbohydrate sources or the culture medium may comprise Dulbecco's minimum essential medium (DMEM), F-12 basal medium (DMEM-F12), L-glutamine, a non-ionic surfactant, geneticin, and maltose, or a modified version thereof.

In some examples, the increased protein yield may be increased by about 5%, 10%, 15%, 20%, 25%, 30%, 35%, 40%, 45%, 50%, 55%, 60%, 65%, 70%, 75%, 80%, 85%, 90%, 95%, or 100%. In some examples, the increase of protein yield may be an increase in the production of antibody, wherein the increase in antibody titer may be by about 2% to about 300%, or about 2%, or about 4%, or about 6%, or about 8%, or about 10%, or about 12%, or about 14%, or about 16%, or about 18%, or about 20%, or about 22%, or about 24%, or about 26%, or about 28%, or about 30%, or about 32%, or about 34%, or about 36%, or about 38%, or about 40%, or about 43%, or about 45%, or about 48%, or about 50%, or about 55%, or about 60%, or about 65%, or about 70%, or about 75%, or about 80%, or about 90%, or about 100%, or about 125%, or about 150%, or about 175%, or about 200%, or about 230%, or about 250%, or about 300%.

In some examples, the method as described herein may increase cell specific productivity by about 2% to about 300%, or about 2%, or about 4%, or about 6%, or about 8%, or about 10%, or about 12%, or about 14%, or about 16%, or about 18%, or about 20%, or about 22%, or about 24%, or about 26%, or about 28%, or about 30%, or about 32%, or about 34%, or about 36%, or about 38%, or about 40%, or about 43%, or about 45%, or about 48%, or about 50%, or about 55%, or about 60%, or about 65%, or about 70%, or about 75%, or about 80%, or about 90%, or about 100%, or about 125%, or about 150%, or about 175%, or about 200%, or about 230%, or about 250%, or about 300%.

In some examples, the cell culture media and/or methods as described herein may increase maximum viable cell density/number by about 2% to about 300%, or about 2%, or about 4%, or about 6%, or about 8%, or about 10%, or about 12%, or about 14%, or about 16%, or about 18%, or about 20%, or about 22%, or about 24%, or about 26%, or about 28%, or about 30%, or about 32%, or about 34%, or about 36%, or about 38%, or about 40%, or about 43%, or about 45%, or about 48%, or about 50%, or about 55%, or about 60%, or about 65%, or about 70%, or about 75%, or about 80%, or about 90%, or about 100%, or about 125%, or about 150%, or about 175%, or about 200%, or about 230%, or about 250%, or about 300%, as measured over a course of, for example, 14 days.

Figure 8:
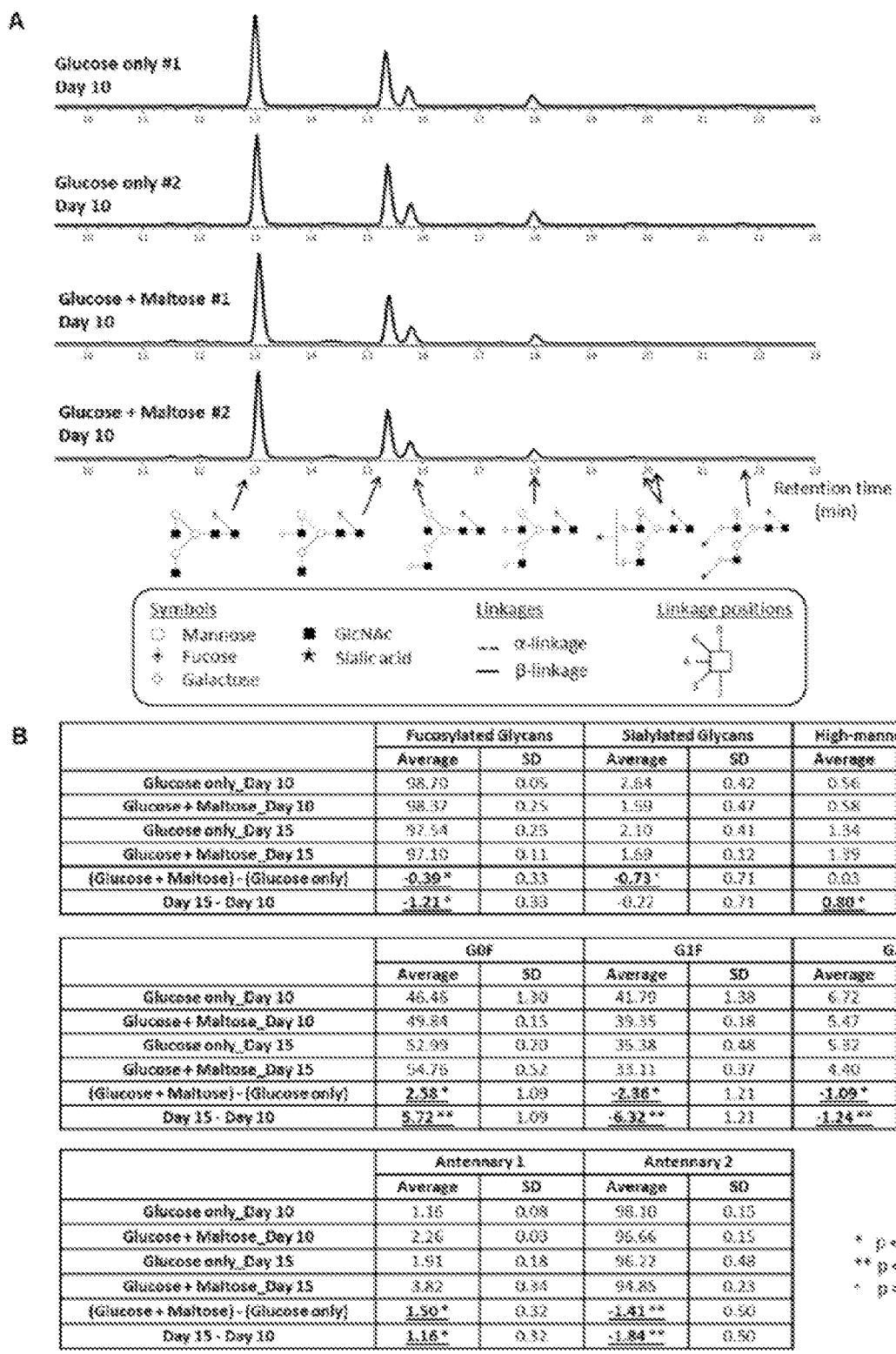
FIG. 8 shows glycosylation profiles of anti-Her2 antibody produced from SH87 fedbatch bioreactor cultures in glucose only or glucose+maltose protein-free chemically defined medium (PFCDM) base medium. Anti-Her2 monoclonal antibodies were purified from samples from Day 10 and Day 15 of the SH87 fedbatch cultures in PFCDM with 4 g/l glucose or 4 g/l glucose+20 g/l maltose (FIG. 7), and subjected to glycosylation profiling. (A) are representative fluorescence chromatograms of the four Day 10 samples with symbolic representations of selected structures. (B) shows relative abundance of glycan structures. Average and standard deviation of the two (2) biological replicates were shown. The average difference between Glucose+Maltose and Glucose only samples, as well as that between Day 15 and Day 10 samples were also calculated. Effects of maltose supplementation and late Day 15 harvest on the relative abundance of glycan structures were bold and underlined. p-values were calculated using paired one-tail Student's t-Test on data from individual samples. Thus.

As described in FIG. 8 and Table 3, the cell culture medium as described herein and/or the methods as described herein may be used to fine-tune glycosylation profiles of the protein product (e.g. recombinant glycoprotein product). In one aspect, there is provided a method of modulating glycosylation profile of a protein, wherein said method comprises culturing a cell expressing said protein in a cell culture media as described herein, to thereby produce a cell that expresses the protein with a modulated glycosylation profile. In some example, the modulation of glycosylation profile of the protein may be the modulation of glycosylation such as, but is not limited to, antennae, fucosylation, a mannosylation, a sialylation, or combination thereof, and the like.

As used herein, the term "modulation" refers to an increase or decrease of a specific type of glycosylation of the protein as compared to a control. As used herein, the "control" medium may be a cell culture medium that is the same as the culture medium as described herein with the exception of the control does not contain maltose. That is, the control may be an equivalent cell culture medium of the cell culture medium as described herein with the absence of maltose. The only difference between the control cell culture medium and the cell culture medium as described herein is the presence of disaccharide (such as maltose) in the cell culture medium as described herein.

In some examples, the modulated glycosylated profile includes, but is not limited to, a decreased level of fucosylated glycans, a decreased level of diantennary glycans, an increased level of mannosylated glycans, an increased level of mono-antennary glycans, a decreased sialylated glycans, or combination thereof. Therefore, in one example, there is provided a method of producing a protein having at least one, at least two, at least three, or all of the modulated glycosylation including, but is not limited to, a decreased level of fucosylated glycans, decreased level of diantennary glycans, increased mannosylated glycans, increased monoantennary glycans, and decrease sialylated glycans. In some examples, as illustrated in Table 3, the protein may be an antibody, or an immunoglobulin, or fragments thereof.

In some examples, the modulation of the fucosylation level may be a decrease in the fucosylation level in the protein. In some examples, the decrease in the level of fucosylated glycans may be a decrease of about 0.1%, 1%, 1.2%, 1.5%, 2%, 2.2%, 2.5%, 3%, 3.2%, 3.5%, 4%, 4.2%, 4.5%, 5%, 10%, 15%, 20%, 25%, 30%, 35%, 40%, 45%, 50%, 55%, 60% or 65%.

In some examples, the modulation of the mannosylated glycan level may be an increase in the mannosylation level of the protein. In some examples, the mannosylation level may be an increase of about 0.1%, 1%, 1.2%, 1.5%, 2%, 2.2%, 2.5%, 3%, 3.2%, 3.5%, 4%, 4.2%, 4.5%, 5%, 10%, 15%, 20%, 25%, 30%, 35%, 40%, 45% or 50%.

In some examples, the modulation of the sialylation level may be a decrease in the sialylation level in the protein. In some examples, the decrease in the level of sialylated glycans may be a decrease of about 0.1%, 1%, 1.2%, 1.5%, 2%, 2.2%, 2.5%, 3%, 3.2%, 3.5%, 4%, 4.2%, 4.5%, 5%, 10%, 15%, 20%, 25%, 30%, 35%, 40%, 45%, 50%, 55%, 60% or 65%.

In some examples, the modulation of the mono-antennary glycan level may be an increase in the mono-antennary glycan level of the protein. In some examples, the mono-antennary glycan level may be an increase of about 0.1%, 1%, 1.2%, 1.5%, 2%, 2.2%, 2.5%, 3%, 3.2%, 3.5%, 4%, 4.2%, 4.5%, 5%, 10%, 15%, 20%, 25%, 30%, 35%, 40%, 45% or 50%.

In some examples, the modulation of the diantennary glycan level may be a decrease in the diantennary glycan level in the protein. In some examples, the decrease in the level of diantennary glycan may be a decrease of about 0.1%, 1%, 1.2%, 1.5%, 2%, 2.2%, 2.5%, 3%, 3.2%, 3.5%, 4%, 4.2%, 4.5%, 5%, 10%, 15%, 20%, 25%, 30%, 35%, 40%, 45%, 50%, 55%, 60% or 65%.

As used herein, the term "antennae" refers to the addition of GlcNAc sequences to glycan core in hybrid and complex glycans. Thus, a "mono-antennary glycans" refers to one GlcNAc branch linked to the core glycan, a "diantennary glycans" refers to two GlcNAc branches linked to the core glycan, and the like.

In one example, there is provided a method of producing compositions comprising an antibody, or antigen binding fragment thereof, with a modulated glycosylation profile. The methods may include culturing a host cell expressing the antibody, or antigen binding fragment thereof, in cell culture media as described herein, thereby producing the composition comprising the antibody, or antigen binding fragment thereof, with at least one (at least two, or all) selected from the group consisting of a 0.1-50% decrease in the level of fucosylated glycans, a 0.1-50% decrease in the level of sialylated glycans, and a 0.1-50% increase in the level of mannosylated glycans as compared to a control. In some examples, the control is a composition comprising an antibody, or antigen binding fragment thereof, produced by culturing a host cell expressing the antibody, or antigen binding fragment thereof, in cell culture media which is not cultured in the culture media as described herein. In one example, the antibody is an anti-Her2 antibody, or an antigen binding fragment thereof. In one example, the culture media comprises glucose and/or maltose.

As shown in FIG. 8A, maltose supplementation may also reduce the sialylation level in the antibody expressed. It is known that reduction of sialylation level of an antibody may improve the antibody-dependent cellular cytotoxicity (ADCC) of therapeutic antibodies. As such, in some examples, the present disclosure also provide methods of producing compositions comprising an antibody, or antigen binding fragment thereof, with a modulated glycosylation profile by culturing a host cell expressing the antibody, or antigen binding fragment thereof, in cell culture media as described herein, thereby producing the composition comprising the antibody, or antigen binding fragment thereof, with a 0.1-30% increase in antibody-dependent cellular cytotoxicity (ADCC) response as compared to a control, wherein the control is a composition comprising an antibody, or antigen binding fragment thereof, produced by culturing a host cell expressing the antibody, or antigen binding fragment thereof, in cell culture media which is not a cell culture medium as described herein. In one example, the antibody is an anti-Her2 antibody, or an antigen binding fragment thereof. In one example, the culture media comprises glucose and/or maltose.

The cell culture mediums as described herein and the methods as described herein may be used for culturing and/or growing and/or increasing the protein yield of cells such as a vertebrate cell, an arthropod cell, an annelid cell, a molluscs cell, a sponge cell, a jellyfish cell, an insect cell, an avian cell, a mammalian cell, a fish cell, and the like. In some examples, the cell culture mediums as described herein and the methods as described herein may be used for culturing and/or growing and/or increasing the protein yield of eukaryotic cells or tissues including animal cells, human cells, insect cells, plant cells, avian cells, fish cells, mammalian cells and the like.

In some examples, the mammalian cell may include, but is not limited to, a human cell, a murine cell, a rat cell, a hamster cell, a rabbit cell, a dog cell, a monkey cell, a hybridoma cell, a CHO cell, a CHO-K1 cell, a CHO-DG44 cell, a CHO-S cell, a CHO-DXB11 cell, a CHO-GS cell, a SH87 cell, a BHK cell, a COS cell, a VERO cell, a HeLa cell, a 293 cell, a PER-C6 cell, a K562 cell, a MOLT-4 cell, an M1 cell, an NS-1 cell, a COS-7 cell, an MDBK cell, an MDCK cell, an MRC-5 cell, a WI-38 cell, a WEHI cell, an SP2/0 cell, a CAP cell, a AGE1.HN cell, or a derivative thereof.

The culture medium as described herein increased the immunoglobulin production of cells. Thus, in some examples, the cell to be cultured in the cell culture and methods as described herein may be an antibody-producing cell. In some examples, the mammalian cell may be a CHO-K1 cell, or a CHO-DG44 cell, or a recombinant protein producing derivative thereof, such as SH87.

For convenience, the culture medium may be provided as a kit. Thus, in one aspect, there is provided a kit comprising the components of the cell culture medium as described herein and/or the components for performing the methods as described herein. In some examples, the kit may further comprise a cell. For example, the cell may be the cell to be cultured. The cell may include, but is not limited to, a vertebrate cell, an arthropod cell, an annelid cell, a molluscs cell, a sponge cell, a jellyfish cell, an insect cell, an avian cell, a mammalian cell, a fish cell, and the like. In some examples, the mammalian cell may include, but is not limited to, a human cell, a murine cell, a rat cell, a hamster cell, a rabbit cell, a dog cell, a monkey cell, a hybridoma cell, a CHO cell, a CHO-K1 cell, a CHO-DG44 cell, a CHO-S cell, a CHO-DXB11 cell, a CHO-GS cell, a SH87 cell, a BHK cell, a COS cell, a VERO cell, a HeLa cell, a 293 cell, a PER-C6 cell, a K562 cell, a MOLT-4 cell, an M1 cell, an NS-1 cell, a COS-7 cell, an MDBK cell, an MDCK cell, an MRC-5 cell, a WI-38 cell, a WEHI cell, an SP2/0 cell, a CAP cell, a AGELHN cell, and the like, or a derivative thereof.

As exemplified in the Experimental Section, the mammalian cell may be a CHO-K1 cell, or a CHO-DG44 cell, or a protein (such as recombinant protein) producing derivative thereof, such as SH87.

In some examples, the cell to be cultured in the culture medium as described herein and/or methods as described herein may be a cell that produces protein such as, but is not limited to, recombinant protein, antibodies, and the like. As illustrated in the Experimental Section below, the protein may be monoclonal antibodies.

The disclosure illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Materials and Methods

Cell Lines and Cell Cultivation

CHO-K1 cell line was previously adapted to suspension culture in a serum-free protein-free medium, HyQ PF-CHO MPS (Hyclone, Logan, UT) supplemented with 2 g/l sodium bicarbonate (Sigma-Aldrich, St. Louis, MO), 3.6 g/l D-(+)-Glucose (Sigma-Aldrich), 6 mM L-Glutamine (Sigma-Aldrich) and 0.1% Pluronic® F-68 (Life Technologies, Carlsbad, CA). SH87, a suspension CHO-K1 cell line that is producing an anti-Her2 monoclonal antibody (Ho et al., 2012), was previously adapted to a DMEM/F12-based protein free chemically defined medium (PFCDM) supplemented with 6 g/l D-(+)-Glucose (Sigma-Aldrich), 8 mM L-Glutamine (Sigma-Aldrich), 0.1% Pluronic F-68 (Life Technologies), and 600 µg/ml G418 disulfate salt (Sigma-Aldrich). Both CHO-K1 and SH87 cells were routinely passaged every 3 to 4 days.

Unless otherwise specified, cell cultures in this disclosure were performed in single-use Erlenmeyer flasks (Corning, Acton, MA) incubated in a humidified incubator (Climo-Shaker ISF-1-W, Kuhner, Switzerland) at 37° C., 8% $CO^2$ and a rotation speed of 110 rpm.

Analysis of Cell Culture Samples

Viable cell density and culture viability were determined by Trypan blue dye exclusion method using Vi-Cell XR Cell Viability Analyzer (Beckman Coulter, Brea, CA) according to manufacturer's instructions. For biochemical and other cell culture parameter analyses, 1 ml of culture sample was centrifuged at 8000 g for 10 minutes to obtain clarified supernatant.

Concentrations of ammonium, glutamine, glucose and lactate were analyzed by the BioProfile 100 Plus (Nova Biomedical, Waltham, MA). Osmolality was measured using a vapor pressure osmometer (Vapro 5520, Wescor, Logan, UT), according to manufacturer's instructions. Maltose concentration was quantified using Maltose Colorimetric/Fluorometric Assay Kit (Biovision, Milpitas, CA), according to manufacturer's instructions. Monoclonal IgG antibody titer was determined by nephelometry using IMMAGE 800 (Beckman Coulter), according to manufacturer's instructions.

Adaptation of CHO Cell Lines into Culture Media with Different Disaccharides

HyQ PF-CHO disaccharide media were prepared by replacing the 3.6 g/l glucose normally added to the medium, with the same mass concentrations of maltose, sucrose, lactose or trehalose during media preparation. CHO-K1 cells were then seeded into these disaccharide media at cell seeding densities of $0.3 \times 10^6$ cells/ml and $1.0 \times 10^6$ cells/ml, and passaged every 3 to 4 days. At each passage during the adaptation process, viable cell density and culture viability before passage and after inoculation into fresh media were determined.

Shake Flask Batch Cultures Sampling and Characterization

For growth curve comparison of CHO-K1 cells in maltose and glucose media, CHO-K1 cells adapted to the maltose medium and non-adapted CHO-K1 cells were seeded into HyQ PFCHO disaccharide medium with 3.6 g/l maltose and the normal HyQ PF-CHO medium with 3.6 g/l glucose, respectively. For the evaluation of maltose utilization using non-adapted SH87, cells were seeded into PFCDM with 4, 6, 14 or 24 g/l glucose, or 4 g/l glucose supplemented with 0.5, 1, 2, 3, 10 or 20 g/l maltose. Cells were cultivated in single-use Erlenmeyer flasks (Corning), with a cell seeding density of $0.3 \times 10^6$ cells/ml in duplicates. Cell culture samples were collected and analyzed daily throughout the duration of the growth profile experiment until culture viabilities fell below 50%. When necessary, culture supernatant samples were stored at −20° C. for further analysis.

Quantification of Intracellular Maltose

Samples for intracellular maltose quantification were prepared by first quenching $10^7$ cells with ice cold 150 mM NaCl (Merck, ACS Reagent Grade) solution. After the cells were pelleted by centrifugation, the supernatant was removed by aspiration and 10 µl of 0.4 mM 13C-maltose (UL-$^{13}C_{12}$ maltose monohydrate, Omicron Biochemicals, South Bend, IN) was added as a reference standard. A two-phase liquid extraction protocol, involving the use of methanol (Fisher Scientific, Optima grade), chloroform (Merck) and tricine (Merck) solution (40:35:25 v/v) (Selvarasu et al., 2012) was utilized to extract intracellular maltose. The extracts were stored at −80° C., dried under vacuum at a temperature of 4° C. (CentriVap, Labconco, US) and reconstituted in a water-methanol mixture (95:5 v/v)

before analysis via liquid chromatography-mass spectrometry (LC-MS) (Acquity UPLC-Xevo TQ-S MS, Waters, Milford, MA). The separation was performed using a C18 reverse phase column (Waters, HSS T3 column, 2.1 mm×50 mm, 1.8 µm particle size), with the following solvents—A: water with 0.1% formic acid (Sigma-Aldrich, 98%), B: Methanol, at a flow rate of 0.4 ml/min. Quantification of intracellular maltose was carried out via multiple reaction monitoring experiments, in which the integrated peak areas for maltose and 13C-maltose in each sample were obtained. The actual concentration of maltose in each sample was quantified by direct comparison of the relative integrated peak area of maltose to that of the 13C-maltose reference standard. The lower limit of detection for maltose was observed to be 7.5 ng per injection. Intracellular maltose concentration was calculated based on maltose quantities within detection limit, number of cells used and average cell diameter obtained from Vi-Cell XR Cell Viability Analyzer. The samples were analyzed on LC-MS in triplicate and the integrated peak areas obtained for each sample were observed to have relative standard deviations of less than 15%.

Bioreactor Fed-Batch Culture Sampling and Characterization

For each culture condition to be tested, SH87 was scaled up in PFCDM and inoculated into duplicate two (2) liter glass bioreactors (Sartorius, Germany) at a viable cell density of $3\times10^5$ cells/ml. Culture temperature, pH, dissolved oxygen and stir rate were maintained at 37° C., 7.1, 50% and 120 rpm respectively. The culture set points for glucose and glutamine were 0.5 g/l and 0.5 mM respectively, and predictive feeding was used to maintain these concentration levels by the addition of a concentrated DMEM-based protein-free feed and a 150 g/l glucose solution. Cell culture samples were collected and analyzed daily throughout the duration of the growth profile experiment until culture viabilities fell below 50%. When necessary, culture supernatant samples were stored at −20° C. for further analysis.

Antibody Glycosylation Analysis

Antibody glycosylation analysis was performed according to previously published protocol with modifications (Chan et al., 2015). Briefly, Protein-A-purified IgG samples were first desalted using a PD 10 column (GE Healthcare, Pittsburgh, PA) following manufacturer's protocol. Then, glycans were released and labeled with RapiFluor MS (RFMS) (Lauber et al., 2015) according to manufacturer's protocol (Waters Corporation, Milford, MA). After labeling, excess RFMS was removed by passing the labeling mixture through a MiniTrap G-10 desalting column (GE Healthcare) and the purified RFMS-labeled glycans were then dried under vacuum. The samples were reconstituted in 200 µl reconstitution buffer containing 42.8 µl of water, 50 µl of dimethylformamide and 107.2 µl of acetonitrile, and analyzed by the UNIFI Biopharmaceutical platform (Waters Corporation, Milford, MA). Raw retention time of each chromatographic peak obtained was converted to a glucose unit (GU) by fitting into a calibration curve established by a RFMS-labeled dextran ladder (Waters Corporation). The observed GU value and the associated mass of each chromatographic peak were then used to search against an experimental database for N-glycans embedded in the UNIFI Biopharmaceutical platform, which contains information on expected GU values and masses of more than 300 N-glycan species. A structure is then assigned to each chromatographic peak based on two orthogonal criteria: 1) the observed GU value matches the expected GU value within 0.2 GU deviation, and 2) the observed mass matches the expected mass of the glycan within 5 ppm mass error. Additionally, knowledge of CHO glycosylation features was applied as biological filter to remove irrelevant candidate structures, such as glycans with bisecting GlcNAc and a2,6-linked sialic acid.

Calculations

Specific growth rate (µ) was determined by plotting ln(VCD) vs t according to Equation 1, where VCD is the viable cell density, $VCD_0$ is the initial viable cell density and t is the culture time.

$$VCD=VCD_0 e^{\mu t}$$

$$\ln(VCD/VCD_0)=\mu t \quad\quad\quad \text{Equation 1}$$

The cumulative integrated viable cell density (IVCD) was calculated by trapezium rule according to Equation 2.

$$IVCD_t = IVCD_{t-1} + 0.5\times(VCD_t + VCD_{t-1})\times\Delta t \quad\quad \text{Equation 2}$$

Specific IgG productivity (qp) between culture times t1 and t2 was determined by plotting IgG titer (P) vs IVCD according to Equation 3.

$$q_p=(P_{t2}-P_{t1})/\text{IVCD}$$

$$P_{t2}=q_p\times\text{IVCD}+P_{t1} \quad\quad\quad \text{Equation 3}$$

Specific substrate consumption rate (qs) between culture times t1 and t2 was determined by plotting substrate concentration (S) vs IVCD according to Equation 4.

$$-q_s=(S_{t2}-S_{t1})/\text{IVCD}$$

$$S_{t2}=-q_s\times\text{IVCD}+S_{t1} \quad\quad\quad \text{Equation 4}$$

Specific substrate consumption rate (qs) was fitted into a Monod model according to Equation 5, where qs_max is the maximum specific substrate consumption rate, S is the substrate concentration, and Ks is the affinity constant.

$$q_s=(q_{s\_max}\times S)/(K_s+S) \quad\quad\quad \text{Equation 5}$$

Results and Discussion

Evaluation of Disaccharides to Support Growth of CHO-K1 Cells

To evaluate the use of disaccharides to support the growth of mammalian cells, a Chinese Hamster Ovary (CHO) cell line, CHO-K1, was cultivated using a seeding cell density of $0.3\times10^6$ cells/ml, with 3.6 g/l of maltose, sucrose, lactose, trehalose or glucose as energy source in a serum-free protein-free cell culture medium HyQ PF-CHO. Osmolality of these culture media were determined to be between 308 and 324 mOsm/kg, well within the range for optimal mammalian cell culture. The viable cell densities and culture viabilities of these cultures at the beginning and end of each passage over a period of 74 days are shown in FIG. 1. While the cells in glucose containing medium grew to high culture viabilities and viable cell densities at each passage, those parameters for cells in disaccharide media decreased and remained stagnant respectively. However, culture viabilities and viable cell densities of the maltose culture started to pick up on Day 14. Proliferation of the cells in maltose culture then maintained over the period of the time studied, while those in the other disaccharides were terminated on Day 31 due to the lack of cell growth and depressed culture viabilities. The same experiment repeated using a higher seeding cell density of $1.0\times10^6$ cells/ml gave similar results (data not shown). Hence, the present disclosure demonstrated that CHO-K1 cells can proliferate in serum-free protein-free culture medium utilizing maltose, but not sucrose, lactose or trehalose, as sugar source.

Figure 2:
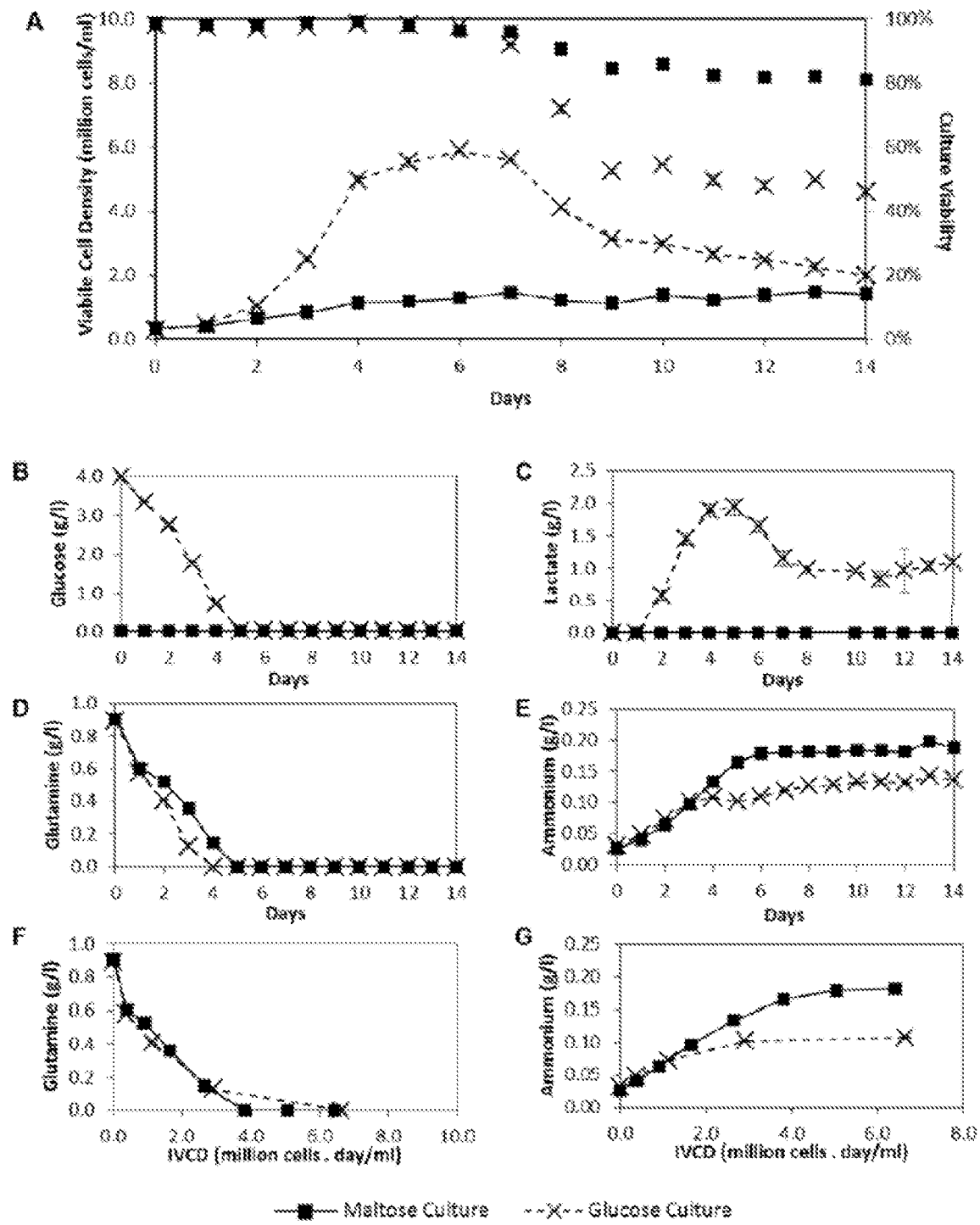
FIG. 2 shows growth and biochemical profiles of CHO-K1 cells adapted to and cultivated in maltose medium, compared to non-adapted CHO-K1 cells cultivated in glucose medium. CHO-K1 cells that were pre-adapted to a serum-free protein-free cell culture medium, HyQ PF-CHO with 3.6 g/l of maltose as carbohydrate source (square marker) and normal non-adapted CHO-K1 cells cultivated in the same culture medium but with glucose as the carbohydrate source (cross) were monitored over 14 days, to obtain their (A) Viable cell densities (lined marker) and culture viabilities (marker only), and (B) Glucose, (C) Lactate, (D) Glutamine and (E) Ammonium profiles. To illustrate the specific consumption and production rates of (F) Glutamine and (G) Ammonium, the concentrations of these components were also plotted against integral viable cell density (IVCD). The averages and standard deviations from three (3) replicate shake flasks were plotted. Thus.

To validate the observation, the growth profile of the adapted CHO-K1 cell line in the maltose protein-free medium was then compared to the CHO-K1 cells cultivated in the glucose protein-free medium, using similar initial cell density and sugar concentration of $0.3 \times 10^6$ cells/ml and 3.6 g/l respectively (FIG. 2). The cells cultivated with maltose as energy source grew to a much lower maximum viable cell density of $1.4 \times 10^6$ cells/ml on Day 7 compared to that with glucose which reached $5.9 \times 10^6$ cells/ml on Day 6 (FIG. 2A). As the initial sugar concentration was the same, the inventors of the present disclosure postulated that this difference may be due to the depletion of other nutrients such as glutamine, since glutamine was depleted at similar rates till completely utilized on Days 4 and 5 for the glucose and maltose cultures respectively (FIG. 2D). Using viable cell density data till Day 4, the doubling time of the maltose culture was 53.7 h compared to 22.3 h for the glucose culture, showing that the rate of energy metabolism may be limiting the cell growth rate in the maltose culture. Interestingly, the maltose culture maintained at high culture viabilities greater than 80% over a longer period of time, compared to cells cultivated in glucose (FIG. 2A). This may be due in part to the lower maximum cell density that the maltose culture reached, which in turn may have resulted in higher amounts of un-metabolized nutrients and a lower accumulation of toxic metabolites at later time points of the culture. Another reason may be that the cells in the maltose culture had a lower metabolism due to the limiting energy uptake rate, and this resulted in less cellular stress and slower cell death.

Examining critical biochemicals in the culture medium, glucose was not detectable in the maltose culture (FIG. 2B), confirming the lack of glucose in the medium from the onset of the culture. As glucose concentration maintained at an undetectable level throughout the culture, this shows that maltose was not hydrolyzed into glucose in the culture medium by secreted maltases, but was consumed by the cells. This consumption may have occurred via one of the three (3) possible mechanisms: (1) maltose may be transported into the cells prior to hydrolysis by intracellular maltase such as acid alpha glucosidase (GAA), or (2) maltose may be hydrolysed by plasma membrane bound maltase, such as intestinal maltase-glucoamylase (MGAM) and sucrase-isomaltase (SI), and immediately taken up by the glucose transporters that are also found on the plasma membrane. These additional steps for energy metabolism may be rate limiting to result in the slow growth rate of the maltose culture, as discussed above. The lack of lactate production in the maltose culture (FIG. 2C) supports this hypothesis as it shows that the cells in the maltose culture utilized the more energy efficient Krebs cycle, rather than ending the glycolysis pathway with lactate production, as embodied by the lactate generation in the glucose culture (FIG. 2C).

Figure 10:
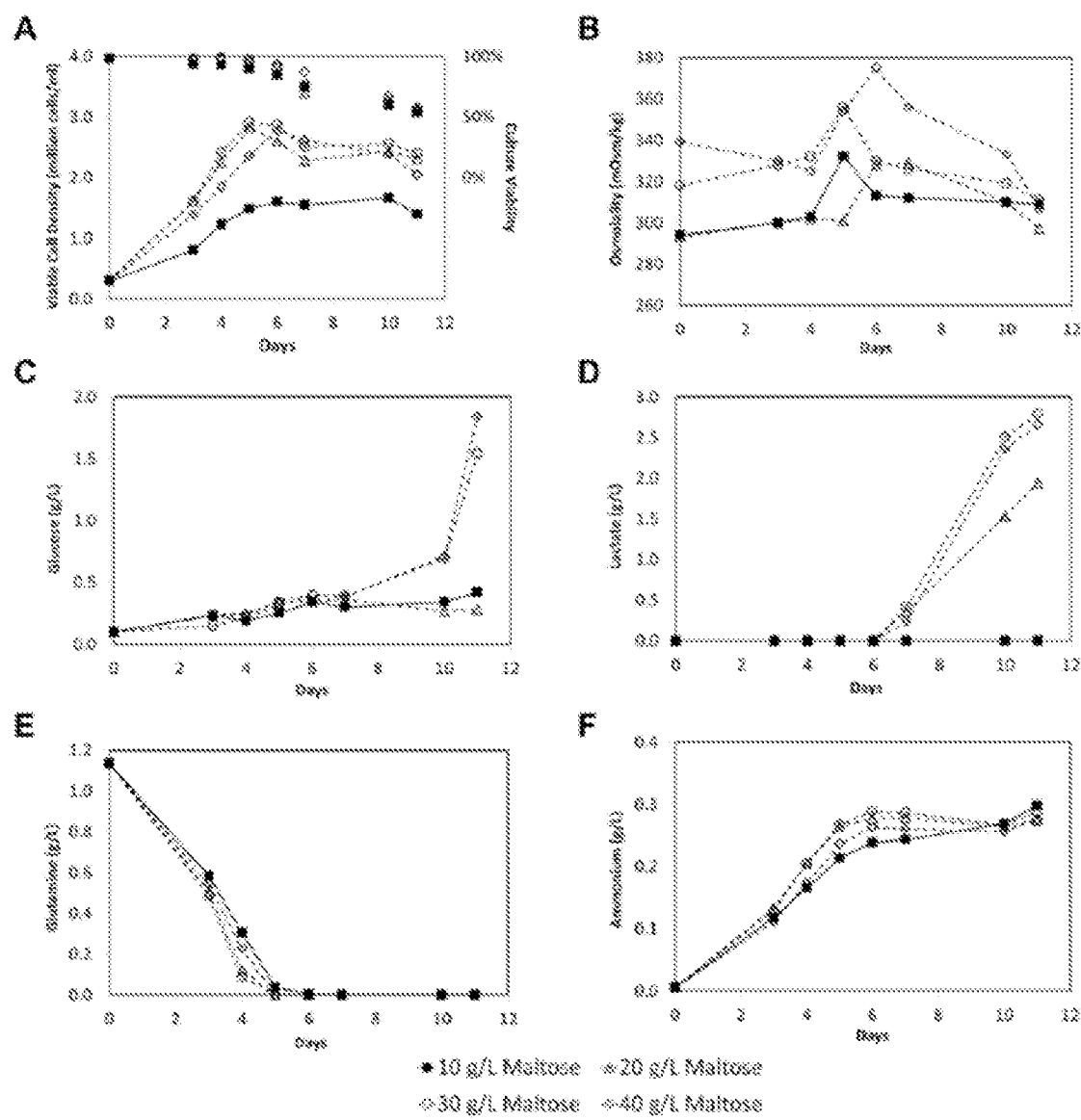
FIG. 10 shows growth and biochemical profiles of CHO-K1 cells in protein free chemically defined medium (PFCDM) with increasing concentration of maltose. CHO-K1 cells adapted to PFCDM with 10 g/L of maltose was cultivated in PFCDM with 10, 20, 30 and 40 g/L maltose in batch shake flask cultures. The cultures were monitored till culture viabilities were lower than 50%, to obtain their (A) Viable cell densities (lined marker) and culture viabilities (marker only), and (B) Osmolality, (C) Glucose, (D) Lactate, (E) Glutamine and (F) Ammonium profiles. Thus.

Examining glutamine consumption, while this was slower in the maltose culture compared to the glucose culture (FIG. 2D), it was likely due to the slower growth of the maltose culture. This is verified by a comparison of the specific glutamine consumption of the glucose and the maltose cultures: By plotting the glutamine profiles of the cultures against the IVCD, it was observed that the specific glutamine consumption, given by the slope of the curve, is similar between the two cultures (FIG. 2F). This demonstrates that glutamine consumption rate of each cell was unaffected by the use of maltose. Given the slower growth rate and lower maximum cell density of the maltose culture, the similar specific glutamine consumption rate shows that more glutamine in the maltose culture was being channeled into energy metabolism instead of cellular replication, when compared to the glucose culture. This hypothesis is supported by the ammonium production profiles: while the specific ammonium production rate was initially similar for both cultures, that for the glucose culture slowed considerably from Day 2 (FIG. 2G) to attain a final ammonium concentration of 0.14 g/l (FIG. 2E), whereas the specific ammonium production rate of the maltose culture continued at a similar rate till Day 5 to attain a higher final ammonium concentration of 0.20 g/l. The slower specific ammonium production rate of the glucose culture from Day 2 can be attributed to the higher cell growth rate (FIG. 2A) and a similar ammonium production rate, showing that more amino acids were utilized for cell replication compared to the maltose culture. The difference in the final ammonium concentrations further supports this, as it shows that more amino acids are subjected to de-amidation to supplement the energy consumption of the cells in the maltose culture when compared to the glucose culture, since both cultures have the same starting concentration of glutamine and other amino acids. It was also noted that the time at which ammonium production plateaued, at Day 4 and Day 6 for the glucose and maltose cultures respectively, corresponded with the times of glutamine depletion for the respective cultures, showing the ammonia accumulation may be partly due to spontaneous glutamine deamidation. When these maltose-adapted CHO-K1 cells were further adapted a DMEM/F12-based protein free chemically defined medium (PFCDM) and tested with increased concentrations of maltose from 10 g/l to 40 g/l, the cells proliferated faster, showing that maltose can be used as a glucose-replacement in the absence of hydrolysates in routine cultivation of mammalian cells (FIG. 10).

Taken together, this data confirms that the cells do proliferate in the maltose medium in the absence of serum or protein supplement, although the cells grow at a slower rate possibly due to rate limiting energy metabolism. Specific consumption of glutamine of the maltose culture remained similar when compared to glucose culture, showing that essential nutrients may be depleted to limit the maximum viable cell density achievable by the maltose culture. The similar specific glutamine consumption rate and increased ammonium production in the maltose culture further shows that more amino acids may be deamidated in the maltose culture to supplement energy metabolism, when compared to the glucose culture.

The survival and proliferation of CHO-K1 cells in maltose containing protein-free medium is surprising because there is no known mammalian maltose transporter and mammalian cells are typically known to be unable to metabolize disaccharides, unless secreted or transmembrane maltases are expressed, for example in intestinal cells. Although CHO cells have been shown to survive using polysaccharides as energy sources, these experiments were performed in serum containing media (Morgan and Faik, 1981), and it was demonstrated that enzymes in serum breaks down these polysaccharides for the cells to metabolize (Scannell and Morgan, 1982). Hence, the present disclosure surprisingly demonstrates the serum-free protein-free mammalian cell culture as disclosed herein, when comprises a disaccharide, can provide sufficient energy source for cell growth.

Application of Maltose to Sustain Culture Viability Upon Glucose Depletion

Since CHO-K1 cells can utilize maltose as energy source and maintain high cell culture viability for extended periods in protein-free culture medium containing maltose in the absence of glucose (FIG. 2), the inventors of the present disclosure proceeded to evaluate whether maltose can be utilized to sustain the culture viability of non-adapted CHO-K1 production cell lines upon glucose depletion. The cells were cultivated in a medium containing both glucose and maltose, to examine whether the cells can grow using glucose in the medium for normal cell growth, followed by a switch to maltose metabolism to maintain culture viability and protein production. This will potentially extend the application of maltose supplementation to non-adapted cell lines, and also be a simple method to extend cell culture viability for higher recombinant protein productivity in batch cultures.

Figure 3:
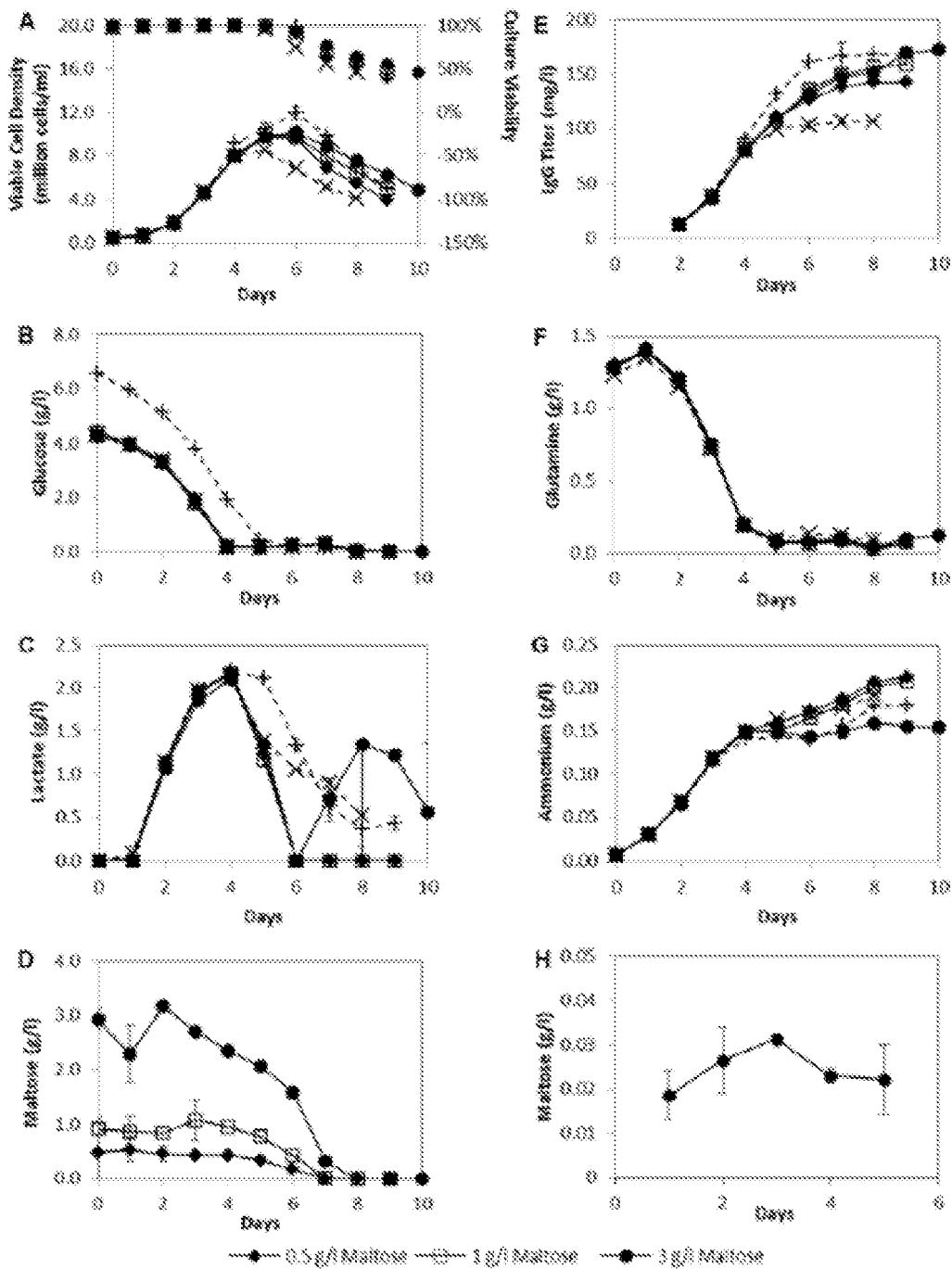
FIG. 3 shows growth and biochemical profiles of a recombinant monoclonal antibody producing CHO-K1 cell line (SH87) cultivated in protein-free chemically defined medium (PFCDM) with both glucose and maltose as sugar source. SH87 cell routinely maintained in glucose-only PFCDM was sub-cultivated into PFCDM with 4 g/l glucose, 4 g/l glucose+0.5 g/l maltose, 4 g/l glucose+1 g/l maltose, 4 g/l glucose+3 g/l maltose, or 6 g/l glucose. The cultures were monitored till culture viabilities were lower than 50%, to obtain their (A) Viable cell densities (lined marker) and culture viabilities (marker only), and (B) Glucose, (C) Lactate, (D) Maltose, (E) IgG titer, (F) Glutamine, and (G) Ammonium concentrations in the culture media. (H) SH87 cells sub-cultivated in PFCDM with 4 g/l glucose, or 4 g/l glucose+3 g/l maltose, were harvested from Days 0 to 5 for LC-MS quantification of intracellular maltose concentrations. Intracellular maltose was found to be absent (below detection limit) in all samples obtained from the 4 g/l glucose cultures and in the sample from Day 0 of the 4 g/l glucose+3 g/l maltose cultures. The averages and standard deviations of two (2) technical replicates from one set of shake flasks were plotted for (D). For the other profiles, the averages and standard deviations from two (2) replicate shake flasks were plotted. Thus.

For this evaluation, a CHO-K1 cell line (SH87) that is producing an anti-Her2 monoclonal antibody (Ho et al., 2012) was used. Batch shake flask cultures of these cells in a DMEM/F12-based protein free chemically defined medium (PFCDM) with 4 g/l glucose, 6 g/l glucose, or 4 g/l glucose supplemented with different concentrations of maltose were monitored till culture viabilities dropped below 50% (FIG. 3). 4 g/l glucose was chosen as the base glucose concentration because this will allow for a premature but controlled cell growth limitation that is mainly due to glucose depletion in the batch cultures for this PFCDM. This controlled growth limitation is observed in FIG. 3A where the 4 g/l glucose culture reached maximum viable cell density (VCD) of $8.5 \times 10^6$ cells/ml on Day 5, one day earlier than the 6 g/l glucose culture, which reached maximum VCD of $11.9 \times 10^6$ cells/ml on Day 6. This corresponded to the glucose depletion for the two cultures, which occurred one day prior to reaching the maximum VCDs (FIG. 3B). As such, by supplementing the 4 g/l glucose culture medium with maltose, the effects of additional maltose on this non-adapted CHO-K1 production cell line can be determined without the added complications of the depletion of other nutrients.

From FIG. 3A, it was observed that all cultures with maltose supplementation have a higher maximum VCD and longer culture viability compared to the 4 g/l glucose only culture, even though the glucose in these culture media were depleted at the same time (FIG. 3B).

Recombinant protein production was also maintained in the maltose supplemented cultures to result in a higher IgG titer compared to the 4 g/l glucose only culture (FIG. 3E). When compared to the 6 g/l glucose only culture, the maximum VCD and IgG titers of the maltose supplemented culture were lower (FIGS. 3A and G), with the exception of the IgG titer of the 3 g/l maltose supplemented culture, which matched that of the 6 g/l glucose culture. This demonstrates that while maltose can support cell growth when glucose was depleted before the 6 g/l glucose culture (FIG. 3B), metabolism is slower in the maltose supplemented cultures to result in slower growth rates. This was further supported by the observation that the growth improvement due to maltose was concentration-dependent (FIG. 3A), showing that the rate of maltose metabolism may be limiting at these concentrations. This corresponded with the ammonium production profiles too (FIG. 3G), which showed higher ammonium production for the 4 g/l glucose cultures with 0, 0.5 and 1 g/l maltose supplement, despite similar glutamine consumption profiles when compared to the cultures with 6 g/l glucose or that with 3 g/l maltose supplement (FIG. 3F). This shows that more amino acids are subjected to deamidation to supplement the energy consumption in the cultures with no or low concentrations of maltose. On the other hand, the 3 g/l maltose supplemented culture has a lower ammonia production that was similar to that of the 6 g/l glucose culture (FIG. 3G). This shows that the rate of maltose metabolism was sufficient for the cells' reduced energy requirements at this maltose concentration during the later phase of the batch culture.

When lactate profiles are examined, it was noted that lactate consumption occurred with the depletion of glucose for all cultures (FIG. 3C). In contrast to glucose-only cultures where lactate consumption was partial, all lactate was consumed at Day 6 for maltose-supplemented cultures. It was postulated that the complete lactate consumption may be facilitated by maltose metabolism which kept the culture viable and metabolizing in a low glucose environment for a longer time to utilize the lactate. This property of maltose supplemented cultures may be useful in biopharmaceutical production because lactate accumulation commonly causes cell toxicity in fed-batch bioreactor production processes (Hassell et al., 1991; Lao and Toth, 1997). Interestingly, lactate production was observed again from Day 6 onwards for the culture supplemented with 3 g/l maltose, supporting the hypothesis that the maltose metabolism rate was sufficient for the cells to survive on glycolysis at this maltose concentration.

When the culture supernatant maltose concentrations were analyzed, it was observed that maltose was indeed consumed by the cells, and that most consumption occurred when glucose was depleted (FIG. 3D). This indicates that these cells preferentially utilized glucose for growth, and when the glucose was depleted, the culture switched to maltose metabolism which helped to maintain culture viability (FIG. 3A). Interestingly, maltose was depleted at about the same day even though the initial maltose concentrations vary by up to a 6 fold difference. This can be partially attributed to the difference in VCD in the various maltose-supplemented culture, but it also shows that maltose metabolism may be concentration-dependent at these maltose concentrations, resulting in higher maltose utilization at higher maltose concentrations.

To determine whether maltose could be internalized by the cells, SH87 cell samples from both the 4 g/l glucose-only culture and the 3 g/l maltose-supplemented culture were obtained for LC-MS analysis (FIG. 3H). While intracellular maltose was detected 1 day after seeding into the maltose-supplemented culture medium, it was found to be absent (below detection limits) in cells cultivated in glucose-only medium or immediately after seeding into the maltose-supplemented medium. This confirmed the presence of an intracellular maltose pool in the cultures supplemented with 3 g/l maltose, and demonstrates that maltose did enter these cells, despite the lack of known transport mechanism, adding further evidence that maltose is indeed utilized by the cells in the maltose-supplemented cultures. In addition, further hints regarding maltose transport were noted from the intracellular maltose concentrations, which were maintained at levels approximately 100 times lower than that in the culture medium over the 5 days monitored: This shows that the transport of maltose may be actively regulated to prevent its accumulation inside the cells despite the concentration gradient, since the cells only switched to maltose metabolism upon glucose depletion (FIG. 3D).

Figure 4:
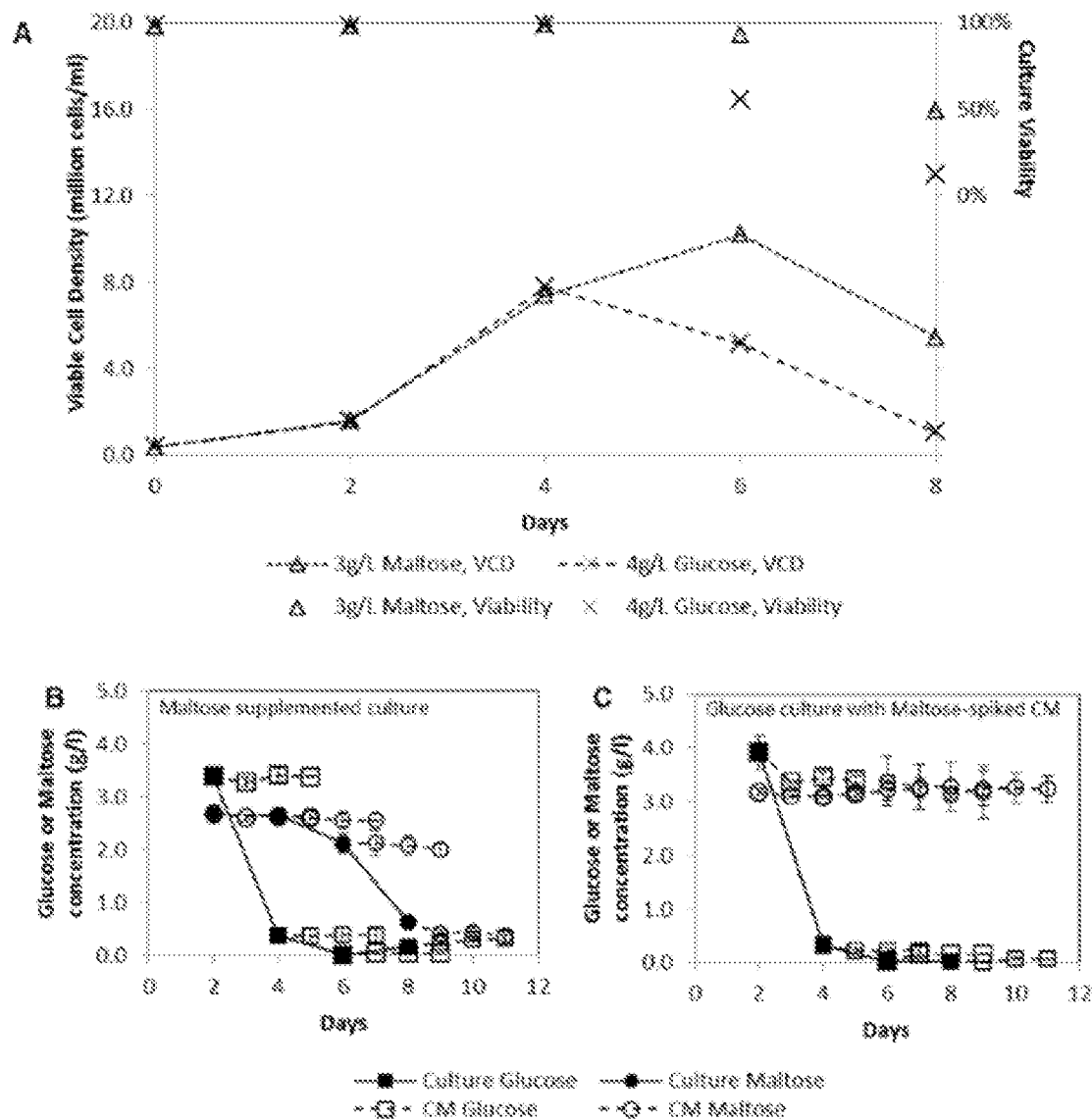
FIG. 4 shows maltose and glucose profiles in cell-free conditioned media (CM). In (A) SH87 cell were routinely maintained in glucose-only PFCDM was sub-cultivated into PFCDM with 4 g/l glucose, or 4 g/l glucose+3 g/l maltose. On Days 2, 4, 6 and 8, cell-free conditioned medium (CM) were harvested from both cultures. Viable cell densities (lined marker) and culture viabilities (marker only) were also monitored. In (B) CM from the maltose supplemented culture were incubated for a further 3 days at 37° C. Samples were harvested daily from these CM, starting from the day of harvest, to determine glucose and maltose concentrations. In (C) CM harvested from the glucose culture were spiked with maltose to a final concentration of 3 g/l prior to further incubation at 37° C. Samples from these CM were harvested daily for a further three (3) days to determine glucose and maltose concentrations. The averages and standard deviations from two (2) replicate shake flasks were plotted. Thus.

To further validate that the maltose was indeed utilized by the cells and not hydrolyzed in the culture media, cell-free conditioned media (CM) from Days 2, 4, 6 and 8 were obtained from a 3 g/l maltose supplemented culture as well as a 4 g/l glucose culture. 3 g/l maltose was spiked into the CM from the glucose culture, and both sets of CM were monitored over 3 days for changes in glucose and maltose concentrations at 37° C. (FIG. 4). The growth profiles of the cultures were similar to those in FIG. 3A, with the maltose supplemented culture having a higher viable cell density and extended culture viability at Days 6 and 8 when compared to the glucose culture (FIG. 4A). Glucose and maltose profiles for the maltose supplemented culture were also similar, with glucose depleting on Day 6 and maltose being depleted between Days 4 and 8 (FIG. 4 B). On the other hand, the CM harvested from the maltose supplemented culture maintained the same glucose and maltose concentrations at which they were harvested, despite being incubated at the same temperature over 3 days (FIG. 4 B). Similarly, the CM from the glucose culture that were spiked with 3 g/l maltose maintained at consistent glucose and maltose concentrations despite the low culture viabilities on Days 6 and 8 (FIG. 4 C). This demonstrates that the presence of cells was necessary for the utilization of the maltose, and that maltose hydrolysis was not occurring spontaneously in the conditioned culture media, even when culture viabilities were low. Since maltose can be hydrolyzed by pancreatic and salivary α-amylases which are secreted proteins, intestinal maltase-glucoamylase and sucrose-isomaltase which are transmembrane proteins, and lysosomal α-glucosidase and neutral α-glucosidase C which are intracellular proteins, this data confirms that the secreted maltases were not involved in the maltose metabolism in these CHO cells.

As the culture medium as described herein does not contain serum, hydrolysates nor proteins, the present disclosure precluded the roles of undefined media components in these observations, and conclusively proved that CHO-K1, a mammalian cell line, can utilize maltose for growth and recombinant protein production. Furthermore, this data shows that the cells do not need prior adaptation to utilize maltose and to sustain culture viability in a biphasic manner.

Comparison of Batch Cultures with High Glucose and Maltose Concentrations

Figure 5:
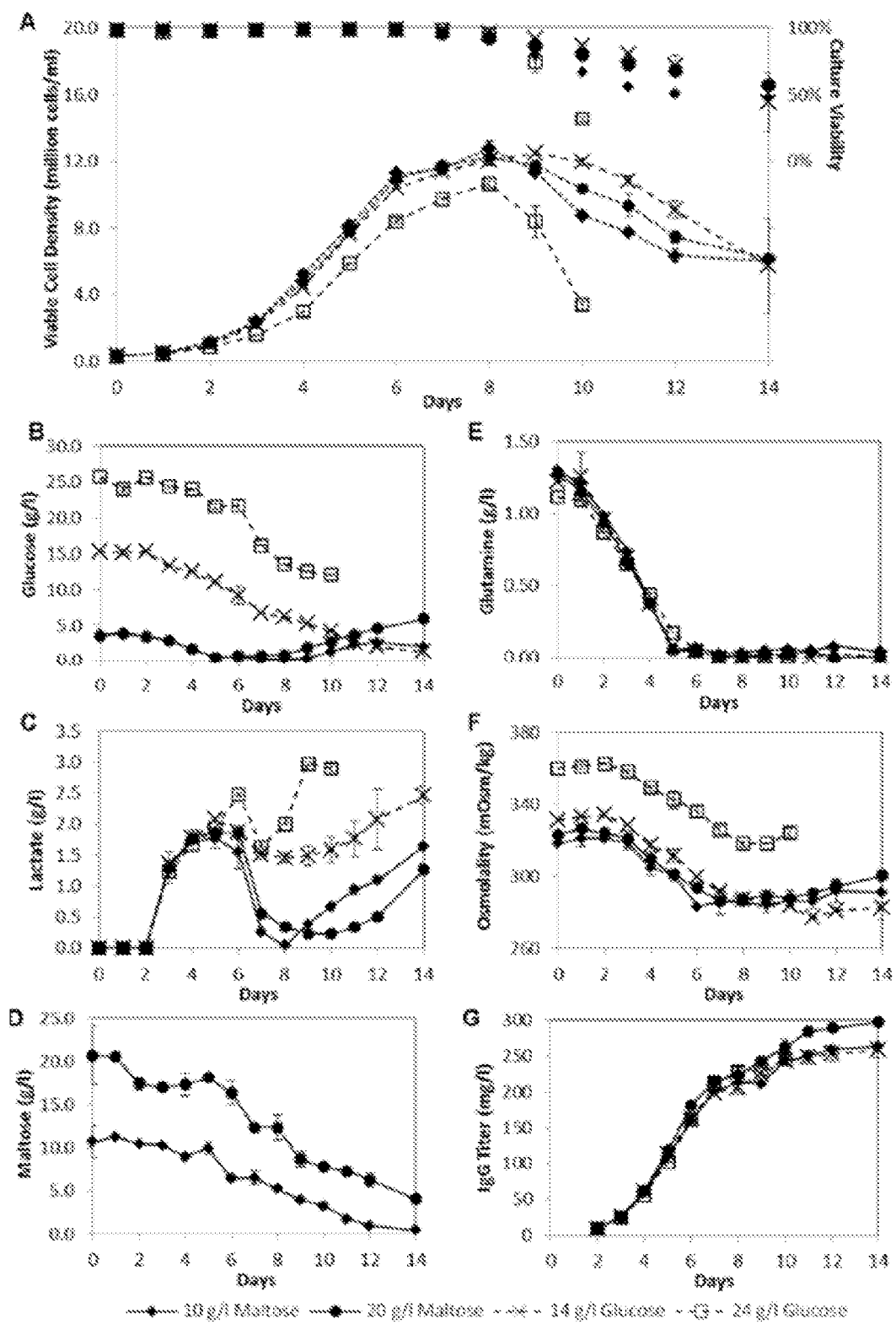
FIG. 5 shows growth and biochemical profiles of SH87 cultivated in protein-free chemically defined medium (PFCDM) with high concentrations of glucose and maltose. SH87 cell routinely maintained in glucose-only PFCDM was sub-cultivated into PFCDM with 14 g/l glucose, 24 g/l glucose, 4 g/l glucose+10 g/l maltose, or 4 g/l glucose+20 g/l maltose. The cultures were monitored till culture viabilities were lower than 50%, to obtain their (A) Viable cell densities (lined marker) and culture viabilities (marker only), and (B) Glucose, (C) Lactate, (D) Maltose, (E) Glutamine, (F) Osmolality, and (G) IgG titer profiles. For the maltose profile, the averages and standard deviations of two (2) technical replicates from one set of shake flasks were plotted. For the other profiles, the averages and standard deviations from two (2) replicate shake flasks were plotted. Thus.

As it was observed that maltose metabolism may be limiting at concentrations of 3 g/l or less, the culture profiles of SH87 in media supplemented with 4 g/l glucose and 10 g/l or 20 g/l maltose was compared to cultures of the same cells in media containing 14 g/l and 24 g/l glucose (FIG. 5). The 24 g/l glucose culture grew slower, reached a lower maximum VCD of 10.6×106 cells/ml, and reached a low viability of less than 50% faster than the other 3 cultures (FIG. 5A). The slower growth of the 24 g/l glucose culture can be attributed to the higher osmolality (360 mOsm/kg) of the culture medium (FIG. 5F), while the culture media of the other 3 cultures had similar osmolality between 318 and 331 mOsm/kg that were within the range for optimal mammalian cell culture. This confirms a limitation of high glucose loading in batch culture medium because glucose contributes to osmolality significantly and can affect cell growth at high concentrations. In contrast, the same mass concentration of maltose contributed to less increase in osmolality and thus had no negative effect on cell growth.

Comparing the growth profiles of the 10 g/l maltose, 20 g/l maltose and 14 g/l glucose cultures (FIG. 5A), they were similar even after glucose concentration reached its minimal on Day 5 for the maltose supplemented cultures (FIG. 5B). This shows that the rate of maltose metabolism is not limiting cell growth at these concentrations, in contrast to the slower growth observed at maltose concentrations lower than 3 g/l after glucose depletion (FIGS. 3A and B). The hypothesis that the maltose metabolism was higher at these concentrations is supported by observations of glucose accumulation in the 10 g/l and 20 g/l maltose supplemented cultures (FIG. 5B), a phenomenon not observed previously (FIG. 3B). This shows that maltose was hydrolyzed faster than the cells' metabolic requirements during the corresponding culture times: Glucose accumulation was observed in the 20 g/l maltose supplemented culture after Day 5, when the cells were still growing at a similar rate as the 14 g/l glucose culture, demonstrating that maltose metabolism was not limiting cell growth at this maltose concentration. At the lower maltose concentration of 10 g/l, glucose accumulation was observed only after Day 8, when the cells are entering death phase. With the cells growing similarly to the 14 g/l glucose culture, this illustrates that maltose metabolism rate was just ample to support cell growth at 10 g/l maltose without excess glucose accumulating in the culture medium.

Also worth noting here is that the lactate concentrations of the glucose only cultures accumulated throughout the culture duration, in contrast to the maltose supplemented cultures which consumed most of the lactate from Days 5 to 8 (FIG. 5C). While a second lactate production phase was observed after Days 9 and 10 for the 10 g/l and 20 g/l maltose supplemented cultures respectively, the lactate concentrations in these cultures reached significantly lower levels as compared to the glucose cultures. This verifies another limitation of glucose loading in batch culture medium: because lactate accumulation can result in cell toxicity (Hassell et al., 1991; Lao and Toth, 1997), the lack of its consumption with high glucose loading can limit the growth of the cell culture. In this case, this lactate toxicity may have contributed to the faster death phase observed for the 24 g/l glucose culture.

Examining the maltose profiles of the maltose supplemented cultures, most maltose were consumed after glucose depletion on Day 5 (FIG. 5D), similar to previous data (FIG. 3D), and maltose was not depleted for both maltose supplemented cultures till the end of the run on Day 14. Similarly, glucose was not depleted for both glucose cultures (FIG. 5B). While sugars were present in excess, other nutrients may be limiting the growth of these cells, for example, glutamine was depleted at Day 6, at similar rates for all 4 cultures (FIG. 5E). These other limitations may have affected growth similarly to result in the similar growth profiles of the maltose supplemented cultures and that of the 14 g/l glucose culture.

Figure 11:
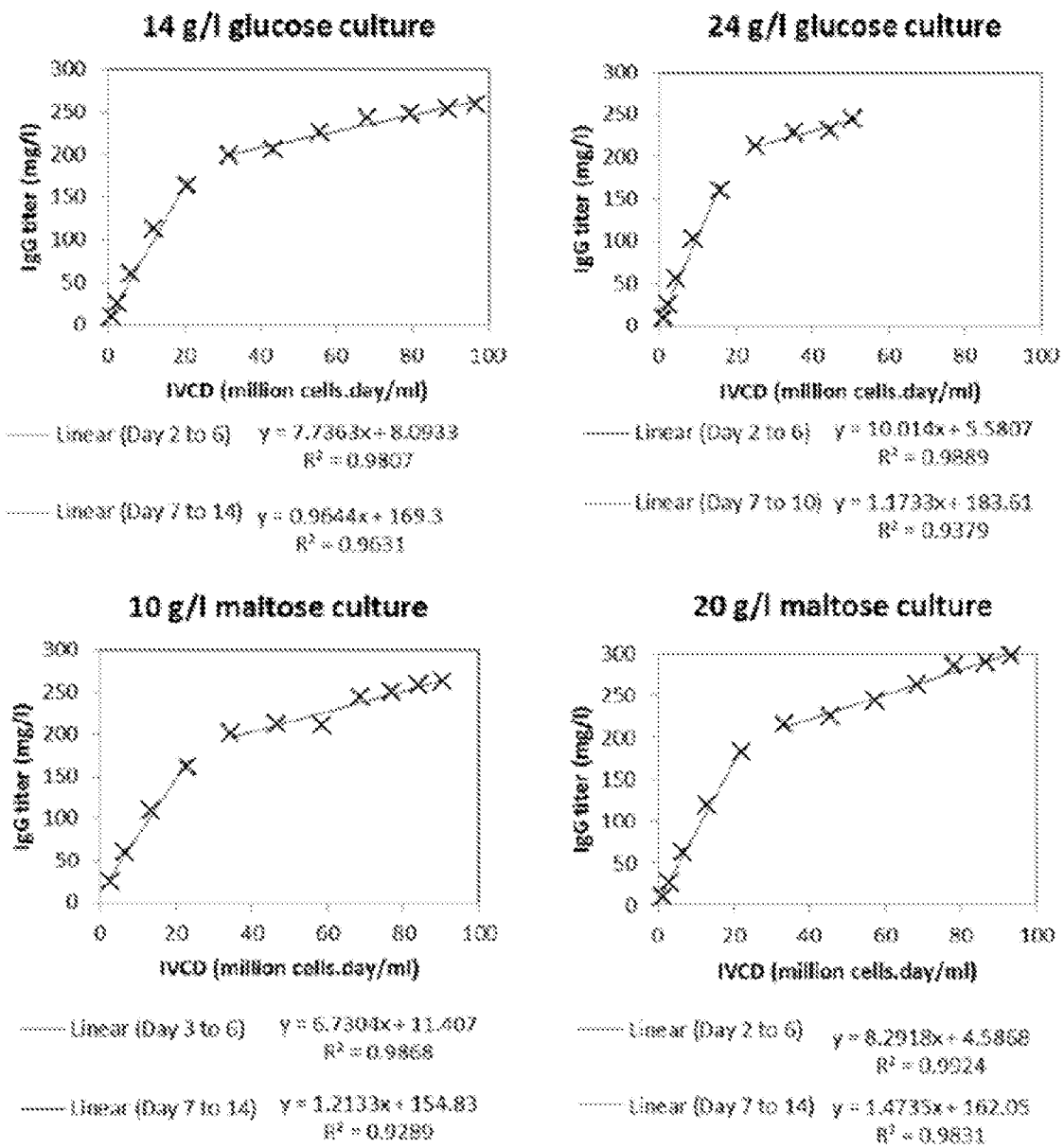
FIG. 11 shows specific IgG productivities of SH87 cultivated in protein-free chemically defined medium (PFCDM) with high concentrations of glucose and maltose. SH87 cell routinely maintained in glucose-only PFCDM was sub-cultivated into PFCDM with 14 g/l glucose, 24 g/l glucose, 4 g/l glucose+10 g/l maltose, or 4 g/l glucose+20 g/l maltose. IgG titers were plotted against IVCD, according to Equation 3. The slope of the graphs gave the specific IgG productivities of the cultures over the time periods. Thus, FIG. 11 supports the data in FIG. 5, where maltose can, in some examples, improve protein productions (i.e. IgG productivities) after glutamine depletion.

With the similar growth profiles, it was interesting to note that the 20 g/l maltose supplemented culture resulted in a maximum IgG titer of 298 mg/l, 15% higher than that obtained from the 14 g/l glucose culture and 10 g/l maltose supplemented cultures which gave maximum titers of 259 mg/l and 263 mg/l respectively (FIG. 5G). To examine this, the specific IgG productivities of the cultures were determined according to Equation 3 (Table 1 and FIG. 11). It was noted that the specific IgG productivities for all 4 cultures decreased after Day 7, when glutamine concentrations reached their minimum, showing that glutamine may be limiting IgG productivity from Day 7. Regardless of glutamine limitation, it was observed that specific IgG productivities were 21 to 29% higher in the culture with more glucose or with more maltose, showing that higher sugar concentrations can improve specific IgG productivities. When the specific IgG productivities of maltose supplemented cultures was compared with their corresponding glucose culture having the same total sugar concentration, the maltose supplemented cultures had 13 to 17% lower specific IgG productivities up to Day 6, though these became 25 to 26% higher than specific IgG productivities of their corresponding glucose culture from Day 7. Hence, the presence of maltose had negatively impacted specific IgG productivities prior to glutamine depletion, but contributed to improved specific IgG productivities after glutamine depletion. As such, the higher sugar content of the 20 g/l maltose supplemented culture resulted in 7 to 53% higher specific IgG productivities when compared to the 14 g/l glucose culture and the 10 g/l maltose supplemented culture respectively, and this had led to the higher maximum IgG titers of the 20 g/l maltose supplemented culture, despite the similar growth profiles.

TABLE 1

Specific IgG productivities of SH87 cultivated in protein-free chemically defined medium (PFCDM) with high concentrations of glucose and maltose.
SH87 cell routinely maintained in glucose-only PFCDM was sub-cultivated into PFCDM with 14 g/l glucose, 24 g/l glucose, 4 g/l glucose + 10 g/l maltose, or 4 g/l glucose + 20 g/l maltose. IgG titers were then plotted against IVCD to obtain the specific IgG productivity as the slope of the graphs, according to Equation 3.

| Culture media sugar content | Specific IgG productivity up to Day 6 (pg/cell/day) | Specific IgG productivity from Day 7 (pg/cell/day) |
| --- | --- | --- |
| 14 g/l glucose | 7.74 | 0.96 |
| 24 g/l glucose | 10.0 | 1.17 |
| 4 g/l glucose + 10 g/l maltose | 6.73 | 1.21 |
| 4 g/l glucose + 20 g/l maltose | 8.29 | 1.47 |

Characterization of Maltose Metabolism Kinetics

Figure 6:
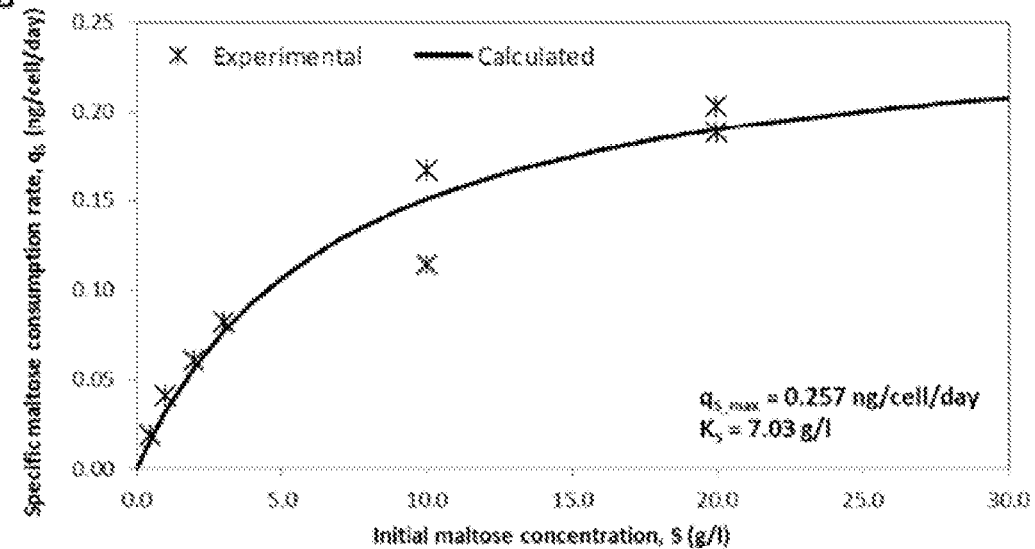
FIG. 6 shows Monod model for specific maltose consumption rate. In (A), specific maltose consumption rates for cultures with different initial maltose concentrations from different experiments were determined as the slope from the plots of maltose concentrations against cumulative integral viable cell densities (IVCD), according to Equation 4. In (B), maximum specific maltose consumption rate (qs_max) and affinity constant (Ks) were determined by non-linear regression, according to Equation 5. The Monod model for specific maltose consumption rate calculated using these parameters and the experimental data used for the model were then plotted. Thus.
Figure 12:
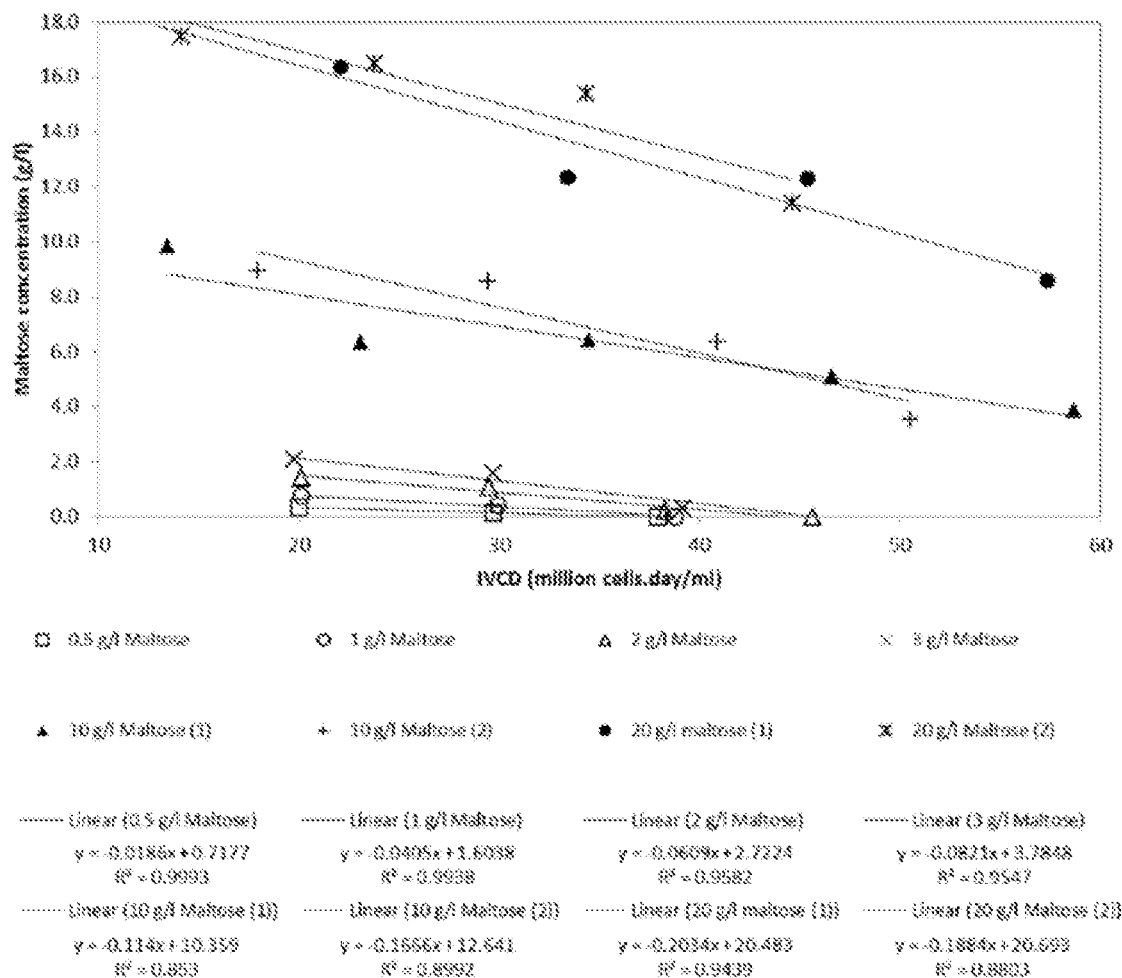
FIG. 12 shows specific maltose consumption rates of SH87 cultivated in protein-free chemically defined medium (PFCDM). SH87 cell routinely maintained in glucose-only PFCDM was sub-cultivated into PFCDM containing 4 g/l glucose and supplemented with 0.5, 1, 2, 3, 10 and 20 g/l maltose. Maltose concentrations were plotted against IVCD, according to Equation 4. The slope of the graphs gave the specific maltose consumption rates of the cultures over the time periods. The 0.5, 1 and 3 g/l maltose cultures were described in FIG. 3; The 10 g/l Maltose (1) and 20 g/l Maltose (1) cultures were described in FIG. 5; Detailed culture data for 2 g/l Maltose, 10 g/l Maltose (2) and 20 g/l Maltose (2) was not described in this report. Thus, FIG. 12 supports the data in FIG. 6, that demonstrates that specific maltose consumption rates may be modelled using Monod equation.

To characterize the maltose metabolism in the maltose supplemented cultures, the specific maltose consumption rates were obtained from plots of maltose concentrations against cumulative integral viable cell densities (IVCD) according to Equation 4. These plots gave straight trendlines with $R^2$ values between 0.853 and 0.999 when 3 to 5 data points after glucose depletion were used (FIG. 12), showing that the specific maltose consumption rates were fairly constant when maltose was metabolized. The slopes of these trendlines gave the average specific maltose consumption rates of these cultures and are tabulated in FIG. 6A. The specific maltose consumption rates increased with increasing initial maltose concentrations, verifying that maltose metabolism was indeed concentration dependent at these maltose concentrations. Additionally, it was observed that the magnitude of increase in specific consumption decreased at higher initial maltose concentrations, showing that there may be a maxima in this relationship. As such, the data was fitted to a Monod model according to Equation 5 by non-linear regression. The data fitted to the model (FIG. 6B) to obtain a maximum specific maltose consumption rate (qs_max) of 0.257 ng/cell/day and an affinity constant (Ks) of 7.03 g/l. While it was noted that a modelling the effect of maltose concentration on specific growth rate may be meaningful, it was not practicable with this data since cell growth were mostly minimal after glucose depletion. Comparing with published specific monosaccharide consumption rates using 3.6 g/l of monosaccharides (Altamirano et al., 2000), the maximum specific maltose consumption rate determined here is similar to the specific consumption rates of fructose (0.21 ng/cell/day) and galactose (0.21 ng/cell/day) while being lower than the measured specific consumption rates of glucose (0.76 ng/cell/day) and mannose (0.88 ng/cell/day). This shows that maltose can be metabolized at rates similar to fructose and galactose while maltose metabolism will be slower than that with glucose and mannose. While the present inventors noted that these parameters can be more accurately determined in continuous cultures, it may be practically challenging at low maltose concentrations since growth rates will be low. Hence, the current data gave a surprising demonstration that mammalian cell may have maltose metabolism kinetics.

Application of Maltose in Fed-Batch Cultures

Figure 7:
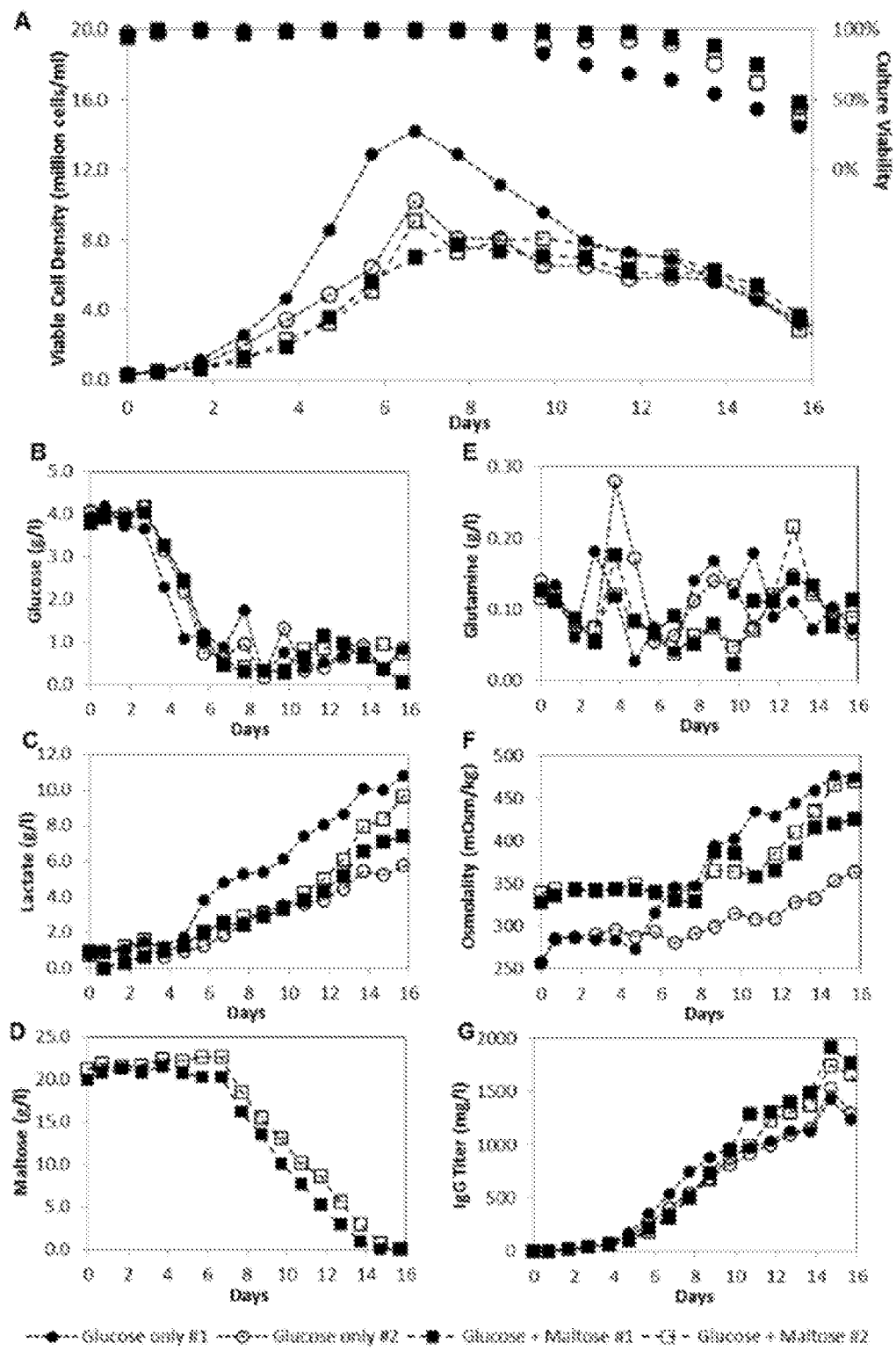
FIG. 7 shows growth and biochemical profiles of SH87 fed-batch bioreactor cultures in glucose only or glucose+maltose protein-free chemically defined medium (PFCDM) base medium. SH87 cell routinely maintained in glucose-only PFCDM was sub-cultivated into PFCDM with 4 g/l glucose or 4 g/l glucose+20 g/l maltose in 2 liter stirred tank bioreactors. The cultures with glucose only base medium were fed daily with 100% of its calculated glucose requirement while the cultures with glucose and maltose base medium was fed daily with 50% of its calculated glucose requirement. Other nutrients were fed similarly in a separate feed using glutamine as reference nutrient. The cultures were monitored till culture viabilities were lower than 50%, to obtain their (A) Viable cell densities (lined marker) and culture viabilities (marker only), and (B) Glucose, (C) Lactate, (D) Maltose, (E) Glutamine, (F) Osmolality, and (G) IgG titer profiles. Duplicate bioreactor cultures were performed for each fed-batch conditions and data from all 4 cultures are plotted. Thus.

Since fed-batch culture is a popular mode for the manufacturing of monoclonal antibodies, the use of maltose in fed-batch cultures was evaluated. In contrast to batch cultures where initial glucose concentration is limited by the detrimental effect on cell growth due to consequent increase in osmolality beyond a certain limit, fed-batch cultures do not have this limitation since glucose can be fed continually into the cultures. As such, it was evaluated whether maltose can be used to supplement glucose in fed-batch cultures to drive the cells towards a slower but more efficient metabolism: Using a common glucose concentration setpoint of 0.5 g/l, SH87 in media supplemented with 4 g/l glucose and 20 g/l maltose was fed daily with 50% of its calculated glucose requirement, while cultures of the same cells in media containing 4 g/l glucose was fed daily with 100% of its calculated glucose requirement. Duplicate bioreactor cultures were performed for each condition and the growth, biochemical and IgG titer profiles of these cultures were plotted in FIG. 7.

In contrast to the lactate consumption observed in the batch cultures (FIGS. 3 and 5), there was no lactate consumption in the fed-batch cultures, even in the maltose-supplemented cultures with a 50% glucose feed (FIG. 7C). It was postulated that this may be due to the consistent nutrient feeding in the fed-batch cultures, whereas glucose, glutamine or other nutrients were likely depleted in the batch cultures to result in the observed lactate consumption. Nonetheless, IgG titers of fed-batch cultures (FIG. 7G) were more than 5 fold that obtained from the batch cultures (FIG. 5G), demonstrating that the feeding strategy was successful in improving IgG production as expected of fed-batch cultures.

Comparing between the fed-batch cultures, the viable cell densities, culture viabilities and lactate profiles of the maltose-supplemented cultures were similar to Glucose-only #2 culture, while Glucose-only #1 culture had a higher maximum viable cell density, a faster decrease in culture viability and a faster lactate accumulation (FIGS. 7A and C). The faster increase in osmolality in glucose-only culture #1 (FIG. 7F) is likely due to pH correction as a result of the faster lactate accumulation. These illustrate possible variability of these parameters in the SH87 fed-batch cultures. On the other hand, glucose and glutamine profiles of maltose supplemented and glucose-only cultures were similar. In addition, IgG titer was fairly consistent between the replicate cultures despite the variability in viable cell density, lactate and osmolality observed in the glucose-only duplicate cultures.

Comparing the glucose profiles, it was interesting to note that despite being fed only at 50% of its calculated glucose requirement, the maltose-supplemented cultures maintained similar culture glucose concentrations as the glucose-only fed-batch cultures. Nonetheless, because of this reduced glucose feeding, specific glucose consumption of the maltose-supplemented cultures was 0.115±0.007 ng/cell/day which is 45% that of the glucose-only cultures at 0.254±0.013 ng/cell/day (Table 2). These show that the maltose-supplemented cultures were most probably using a secondary energy source in addition to glucose to achieve comparable growth and culture viability profiles as Glucose-only #2 culture. This secondary energy source is likely to be maltose, because specific glutamine consumption rates were similar between the maltose-supplemented and glucose-only cultures (Table 2), and maltose consumption was observed in the maltose-supplemented cultures from Day 7, one day after glucose feeding was initiated in the maltose supplemented fed-batch cultures (FIG. 7D).

TABLE 2

Maximum IgG titers, specific production and consumption rates of SH87 cultivated in protein-free chemically defined medium (PFCDM) with and without maltose supplement in fed-batch bioreactor cultures. SH87 cell routinely maintained in glucose-only PFCDM was sub-cultivated in duplicate fed-batch bioreactor cultures (denoted by #1 and #2) as described in FIG. 7. Specific growth rates were determined according to Equation 1. Cumulative amounts of biochemicals produced by the cells were plotted against cumulative Integral Viable Cell (IVC) number to obtain the specific productivities as the slope of the graphs.

| | Maltose supplement | #1 | #2 | Average ± Standard deviation |
|---|---|---|---|---|
| Maximum IgG titer (mg/l) | + | 1920 | 1745 | 1833 ± 124 |
| | − | 1435 | 1530 | 1483 ± 67 |
| Maximum IgG titer (mg/l) | + | 31.2 | 26.3 | 28.8 ± 3.5 |
| | − | 15.6 | 21.5 | 18.6 ± 4.1 |
| Exponential specific growth rate (day-1) | + | 0.49 | 0.501 | 0.496 ± 0.008 |
| | − | 0.696 | 0.607 | 0.652 ± 0.063 |
| Specific glucose consumption (ng/cell/day) | + | 0.11 | 0.119 | 0.115 ± 0.007 |
| | − | 0.263 | 0.245 | 0.254 ± 0.013 |
| Specific glutamine consumption (ng/cell/day) | + | 0.036 | 0.03 | 0.033 ± 0.004 |
| | − | 0.029 | 0.027 | 0.028 ± 0.001 |
| Specific lactate production (ng/cell/day) | + | 0.106 | 0.114 | 0.110 ± 0.005 |
| | − | 0.117 | 0.077 | 0.097 ± 0.028 |

With the maltose supplemented metabolism, it was observed that there were 23% and 55% improvements in maximum IgG titers and specific IgG productivities at 1.833±0.124 g/l and 28.8±3.5 pcd, from the 1.483±0.067 g/l and 18.6±4.1 pcd observed in glucose-only fed-batch cultures respectively (Table 2). When compared to Glucose-only #2 culture with a more comparable growth profile which has maximum IgG titers and specific IgG productivities at 1.53 g/l and 21.5 pcd respectively, the improvements in maximum IgG titers and specific IgG productivities were 20% and 34% respectively.

One possible mechanism for the observed improvement in IgG production may be the higher initial osmolality of the maltose-supplemented cultures due to the additional 20 g/l maltose: This may have resulted in the 22% to 40% lower specific growth rates of the maltose-supplemented cultures compared to the glucose-only cultures (Table 2), to possibly allow slower and more productive maltose-supplemented cultures. Nonetheless, when maltose-supplemented batch culture was compared to glucose-only batch culture having similar initial osmolality (FIG. 5G), an improvement in IgG titer was surprisingly similarly observed. This shows that the improvement in maximum IgG titers observed in the maltose supplemented fed-batch cultures is not only due to osmolality effect: Without wishing to be bound by theory, it is postulated that a lower availability of glucose, enabled by the presence of maltose, may have resulted in a more efficient cell metabolism in the maltose-supplemented culture, to also contribute in the observed higher maximum IgG titers.

Figure 13:
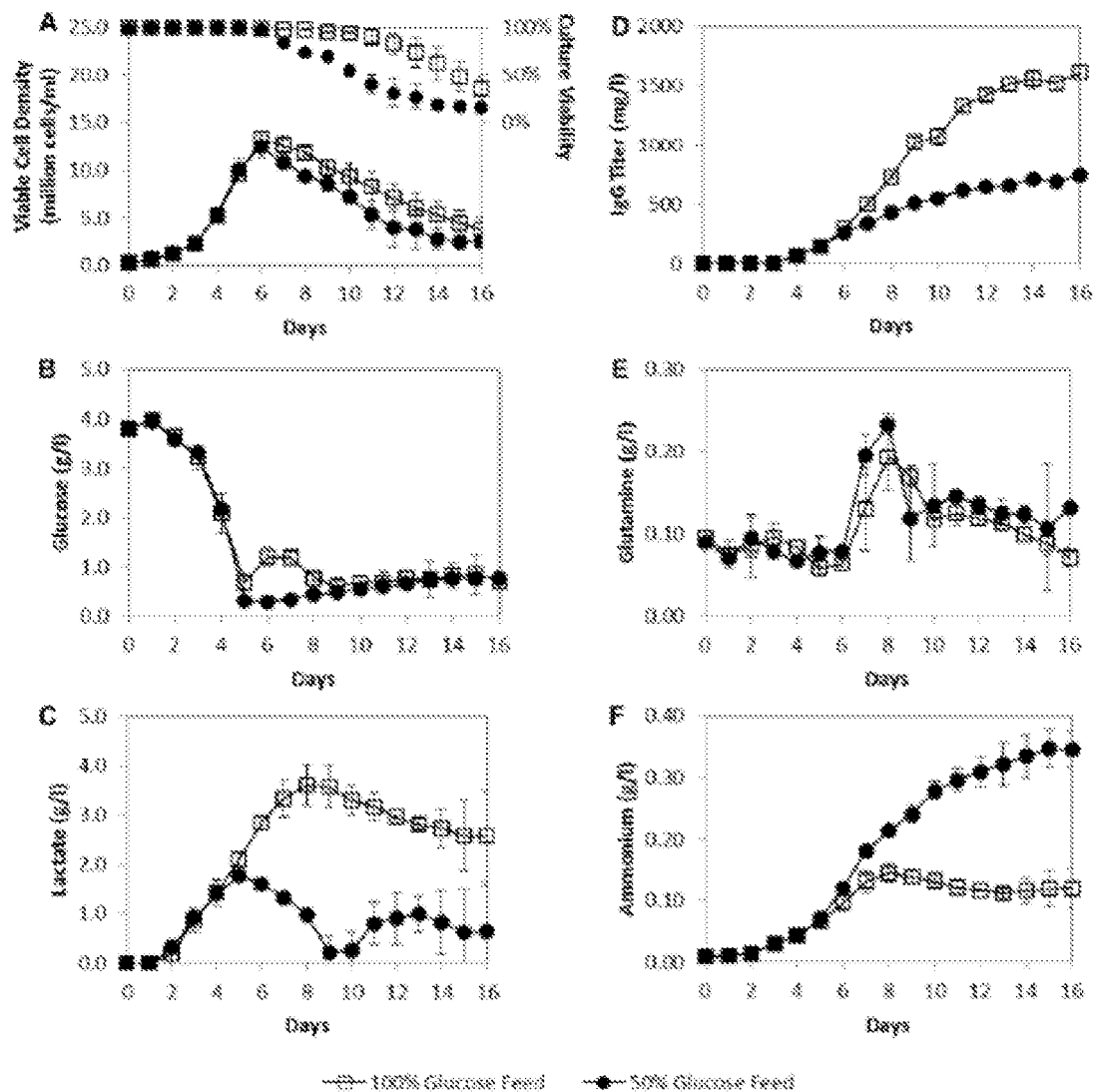
FIG. 13 shows growth and biochemical profiles of SH87 fed-batch bioreactor cultures in glucose only protein-free chemically defined medium (PFCDM) base medium with glucose fed at 100% or 50% of calculated glucose requirements. SH87 cell routinely maintained in glucose-only PFCDM was sub-cultivated into PFCDM with 4 g/l glucose in 2 litre stirred tank bioreactors. The cultures were fed daily with either 100% of its calculated glucose or with 50% of its calculated glucose requirement. Other nutrients were fed similarly in a separate feed using glutamine as reference nutrient. The cultures were monitored till culture viabilities were lower than 50%, to obtain their (A) Viable cell densities (lined marker) and culture viabilities (marker only), and (B) Glucose, (C) Lactate, (D) IgG titer, (E) Glutamine, and (F) Ammonium profiles. Duplicate bioreactor cultures were performed for each fed-batch condition, and the averages and standard deviations from the replicate bioreactor cultures were plotted. Osmolality maintained below 381 mOsm/kg (data not shown). Thus.

To verify whether this lower availability of glucose can have the same effect in the absence of maltose, SH87 glucose-only fed-batch cultures fed was compared with 100% or 50% of their calculated glucose requirements in a separate experiment (FIG. 13). While similar maximum viable cell densities were reached in both conditions before glucose feeding was initiated, the culture viabilities of the glucose-only cultures with 50% calculated glucose feed dropped below 50% 4 days earlier than the cultures with 100% calculated glucose feed. Maximum IgG titers of the 50% fed cultures were also only 46.4% that of the 100% fed cultures. These confirmed that the presence of maltose enabled the use of a lower glucose feed to result in the observed higher maximum IgG titers in FIG. 7G.

As glycosylation is a critical attribute of therapeutic IgG products, purified IgG from glucose only and maltose supplemented cultures from Days 10 and 15 were subjected to glycosylation profiling (FIG. 8). The representative fluorescence chromatograms of Day 10 samples (FIG. 8A) showed that the glycosylation profiles of IgG from both glucose-only and maltose supplemented cultures were similar, showing that maltose supplementation did not grossly affect the glycan profiles of the monoclonal antibodies produced. When the relative abundance of glycan structures of the IgG from maltose supplemented cultures were compared to that from glucose-only cultures (FIG. 8B), it was noted that there were marginally less fucosylated, sialylated, G1F, G2F and biantennary glycans, and more G0F and monoantennary glycans. Most of these differences were also observed when glycans from Day 15 samples were compared to that from Day 10 samples, showing that maltose supplementation affected glycan profiles in a way that is mostly similar to a later harvest. The exceptions to the similarity are in the relative abundances of the sialylated and high-mannose glycans: while the later Day 15 harvests gave higher levels of high-mannose glycans and similar levels of sialylated glycans compared to Day 10 harvests, maltose supplementation gave lower levels of sialylated glycans and similar levels of high-mannose glycans compared to glucose-only cultures. This data shows that maltose supplementation can also be used as a means to fine-tune monoclonal antibody glycosylation profile, especially in marginally reducing the sialylation level, which is known to improve antibody-dependent cellular cytotoxicity (ADCC) of therapeutic antibodies. Additionally, this may also be important in the field of biosimilar manufacturing, where matching of the biosimilar glycan profile to the innovator drug is an important criterion.

Effect of Maltose Supplementation in Both Basal and Feed Media in Fed-Batch Cultures Additionally, the present disclosure investigated whether maltose supplementation in the feed medium can have further effect on fed-batch cultures with maltose-supplemented base medium. Using a common glucose concentration setpoint of 0.5 g/l, SH87 in media supplemented with 4 g/l glucose and 20 g/l maltose was fed daily with 50% of its calculated glucose requirement, using a sugar feed consisting of only glucose, or of glucose and maltose in a 1:1 ratio.

Figure 9:
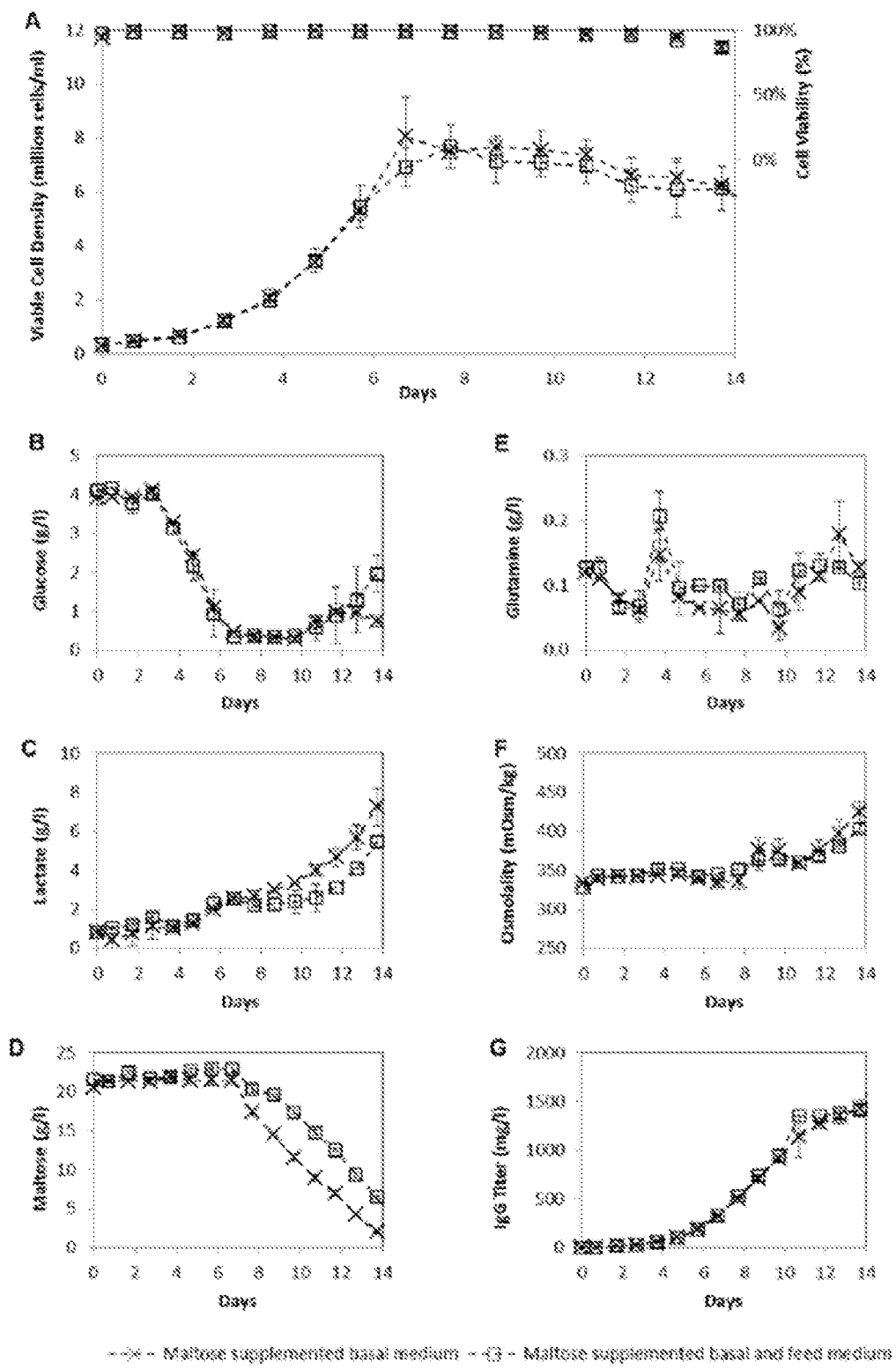
FIG. 9 shows growth and biochemical profiles of SH87 fed-batch bioreactor cultures in glucose+maltose protein-free chemically defined medium (PFCDM) base medium with a glucose-only feed or a glucose+maltose feed. SH87 cell routinely maintained in glucose-only PFCDM was sub-cultivated into PFCDM with 4 g/l glucose+20 g/l maltose in 2 L stirred tank bioreactors. The cultures were fed daily with 50% of its calculated glucose requirement, using a sugar feed consisting of only glucose, or of glucose and maltose in a 1:1 ratio. Other nutrients were fed similarly in a separate feed using glutamine as reference nutrient. The cultures were monitored till culture viabilities were lower than 50%, to obtain their (A) Viable cell densities (lined marker) and culture viabilities (marker only), and (B) Glucose, (C) Lactate, (D) Maltose, (E) Glutamine, (F) Osmolality, and (G) IgG titer profiles. Duplicate bioreactor cultures were performed for each fed-batch conditions, and the averages and standard deviations from replicate cultures were plotted. Thus.

Duplicate bioreactor cultures were performed for each condition and the growth, biochemical and IgG titer profiles of these cultures were plotted in FIG. 9. It was observed that additional maltose supplementation in the feed medium had no additional effect on the cell growth, viability, glutamine, osmolality and IgG titer profiles. This is likely because the initial maltose supplementation was not exhausted in the maltose-supplemented culture with glucose-only feed. It would be expected that the addition of maltose in the feed medium may have an effect if the initial maltose was exhausted in longer fed-batch runs, which can be achieved if temperature and/or pH shift were implemented. It was noted that the additional maltose supplementation in the feed medium increased the glucose concentration and decreased the lactate concentration marginally when compared to the culture with glucose only feed. This may be advantageous in cultures whereby lactate build-up is causing the culture to crash.

Samples from these cultures were similarly subjected to glycosylation analysis. The differences in glycosylation profiles were shown in Table 3.

TABLE 3

Effect of maltose supplementation in feed medium on glycosylation profile. Differences in glycosylation profiles of anti-Her2 antibody produced from SH87 fed-batch bioreactor cultures in glucose only, or glucose + maltose protein-free chemically defined medium (PFCDM) base medium with glucose-only feed (Glucose + Maltose) or glucose + maltose feed (Glucose + Maltose_BF). Anti-Her2 monoclonal antibodies were purified from samples from Day 10 and Day 15 of the SH87 fed-batch cultures and subjected to glycosylation profiling. The differences in relative abundance of glycan structures were calculated using data from two biological replicates. Differences in the effects of maltose supplemented feed compared to maltose culture with glucose-only feed on the relative abundance of glycan structures were in bold.

|  | 1 (Glucose + Maltose_BF) − (Glucose + Maltose) | | 2 (Glucose + Maltose) − (Glucose only) | | 3 Glucose + Maltose_BF) − (Glucose only) | | 4 Day 15-Day 10 | |
|---|---|---|---|---|---|---|---|---|
|  | Average | SD | Average | SD | Average | SD | Average | SD |
| Fucosylated Glycans | −0.81 | 0.44 | −0.39 | 0.33 | −1.19 | 0.41 | −1.21 | 0.39 |
| Sialylated Glycans | 0.14 | 0.40 | −0.73 | 0.71 | −0.59 | 0.52 | −0.19 | 0.55 |
| High-mannose Glycans | 0.39 | 0.38 | 0.03 | 0.27 | 0.42 | 0.36 | 0.73 | 0.34 |
| Antennary 1 | 0.83 | 0.55 | 1.50 | 0.32 | 2.33 | 0.49 | 1.30 | 0.45 |
| Antennary 2 | −0.83 | 0.52 | −1.41 | 0.50 | −2.24 | 0.65 | −1.99 | 0.56 |
| G0F | −0.99 | 1.17 | 2.58 | 1.09 | 1.59 | 1.58 | 4.75 | 1.28 |
| G1F | −0.14 | 0.87 | −2.36 | 1.21 | −2.50 | 1.52 | −5.76 | 1.20 |
| G2F | −0.14 | 0.40 | −1.09 | 0.43 | −1.23 | 0.50 | −1.09 | 0.44 |

Although maltose supplementation in the feed medium has no effect on the titer of the antibody produced, it gave marginally less fucosylated and diantennary glycans and more high mannose and mono-antennary glycans when compared to the maltose culture with glucose-only feed. Comparing column 3 to column 4 in Table 3, it was noted that having maltose in the feed pushed the glycosylation profile of the maltose supplemented culture to be more similar to that of a later harvest. These demonstrates that maltose supplementation in the feed medium can be used to complement the maltose supplemented basal medium to fine tune glycosylation profiles of the recombinant glycoprotein product.

Evaluation of Disaccharides to Support Growth of CHO-DG44 Cells

To determine whether the same approach can be applied on other CHO cell lines, the use of disaccharides to support the growth of CHO-DG44 cells was evaluated. These cells were cultivated with 10 g/l of maltose, sucrose, lactose, trehalose or glucose as energy source in a serum-free protein-free cell culture medium HyQ PF-CHO. The viable cell densities and culture viabilities of these cultures at the beginning and end of each passage over a period of 22 days are shown in FIG. 1B. While the cells in glucose and maltose containing medium grew to high culture viabilities and viable cell densities at each passage, those parameters for cells in other disaccharide media decreased and remained stagnant. Hence, it was demonstrated that CHO-DG44 cells can also proliferate in serum-free protein-free culture medium utilizing maltose, but not sucrose, lactose or trehalose, as sugar source. It would be expected that CHO-DG44 production cells will have similar improvements in growth and product titer with maltose supplementation, as the present disclosure has demonstrated with CHO-K1 cells.

In this disclosure, it was surprisingly demonstrated that CHO-K1 cells can utilize maltose for growth in the absence of serum or protein supplement, although the cells grew at a slower rate. In addition, when culture media with both glucose and maltose were used, prior cell adaptation was not necessary for the utilization of maltose, which followed glucose depletion in a biphasic manner. The utilization of maltose was dependent on the presence of cells in the culture, as maltose was internalized by the cells and maltose hydrolysis did not occur spontaneously in the conditioned culture media. The practical application of maltose supplementation to increase the carbohydrate content of cell culture medium was also shown, since an increased glucose concentration is limited by the corresponding increase in osmolality. The utilization of maltose in batch cell culture has an added advantage of promoting lactate consumption, which will otherwise accumulate and become toxic to the cells. These factors contributed to a 15% improvement in the recombinant monoclonal antibody titer from batch cultures. The specific maltose consumption rates obtained from batch cultures were fitted in a Monod model to obtain a maximum specific maltose consumption rate (qs_max) of 0.257 ng/cell/day and an affinity constant (Ks) of 7.03 g/l.

It was further demonstrated that maltose supplementation can also be applied to fed-batch bioreactor cultures to result in 23% and 55% improvements in maximum monoclonal antibody titers and specific monoclonal antibody productivities respectively, when compared to glucose-only fed-batch cultures. This shows that maltose supplementation can be applied as a simple bioreactor process modification to improve monoclonal antibody yields in current monoclonal antibody manufacturing fed-batch processes. Glycosylation profiling of the antibodies produced from the fed-batch cultures shows that maltose supplementation marginally affected glycan profile similar to a later harvest, with an additional effect of slightly reducing sialylation levels without a concomitant increase in high-mannose glycans. This shows that maltose supplementation can also be applied to marginally affect monoclonal antibody glycosylation profile, which is important in affecting the ADCC of the antibody therapeutic and in the physical matching of biosimilar glycan profile to that of the innovator drug.

In addition to the practical implications of maltose supplementation on biopharmaceutical production, the ability of CHO-K1 cells to utilize maltose in protein-free medium is surprising in itself because there is no known mammalian maltose transporter and mammalian cells are typically known to be unable to metabolize disaccharides. Hence, the present disclosure provides for surprising evidence of a serum-free protein-free mammalian cell culture using a disaccharide as the energy source. Also disclosed is an estimate of maltose metabolism kinetics in mammalian cells.

Furthermore, the present disclosure has demonstrated that maltose supplementation in the feed medium can have marginal effects on the glycosylation profiles of the glycoprotein product, and that CHODG44 cells can also utilize maltose as a carbohydrate source.

REFERENCES

Altamirano, C., Paredes, C., Cairo, J. J., Godia, F., 2000. Improvement of CHO cell culture medium formulation: simultaneous substitution of glucose and glutamine. Biotechnol Prog. 16, 69-75.
Bresseleers, G. J., Goderis, H. L., Tobback, P. P., 1984. Measurement of the glucose permeation rate across phospholipid bilayers using small unilamellar vesicles. Effect of membrane composition and temperature. Biochim Biophys Acta. 772, 374-82.
Chan, K. F., Shahreel, W., Wan, C., Teo, G., Hayati, N., Tay, S. J., Tong, W. H., Yang, Y., Rudd, P. M., Zhang, P., Song, Z., 2015. Inactivation of GDP-fucose transporter gene (Slc35c1) in CHO cells by ZFNs, TALENs and CRISPR-Cas9 for production of fucose-free antibodies. Biotechnol J.
Hassell, T., Gleave, S., Butler, M., 1991. Growth inhibition in animal cell culture. The effect of lactate and ammonia. Appl Biochem Biotechnol. 30, 29-41.
Hayashi, I., Sato, G. H., 1976. Replacement of serum by hormones permits growth of cells in a defined medium. Nature. 259, 132-4.
Ho, S. C., Bardor, M., Feng, H., Mariati, Tong, Y. W., Song, Z., Yap, M. G., Yang, Y., 2012. RES-mediated Tricistronic vectors for enhancing generation of high monoclonal antibody expressing CHO cell lines. J Biotechnol. 157, 130-9.
Jones, M. N., Nickson, J. K., 1982. The human erythrocyte monosaccharide transporter in bilayer lipid membranes. Biochem Soc Trans. 10, 5-6.
Kurano, N., Leist, C., Messi, F., Kurano, S., Fiechter, A., 1990. Growth behavior of Chinese hamster ovary cells in a compact loop bioreactor: 1. Effects of physical and chemical environments. J Biotechnol. 15, 101-111.
Lao, M. S., Toth, D., 1997. Effects of ammonium and lactate on growth and metabolism of a recombinant Chinese hamster ovary cell culture. Biotechnol Prog. 13, 688-91.
Lauber, M. A., Yu, Y. Q., Brousmiche, D. W., Hua, Z., Koza, S. M., Magnelli, P., Guthrie, E., Taron, C. H., Fountain, K. J., 2015. Rapid Preparation of Released N-Glycans for HILIC Analysis Using a Labeling Reagent that Facilitates Sensitive Fluorescence and ESI-MS Detection. Anal Chem. 87, 5401-9.
Lodish H, B. A., Zipursky S L, et al., 2000. Molecular Cell Biology. 4th edition. New York: W. H. Freeman.
Meyer, H., Vitayska, O., Wieczorek, H., 2011. Identification of an animal sucrose transporter. J Cell Sci. 124, 1984-91.
Morgan, M. J., Faik, P., 1981. Carbohydrate metabolism in cultured animal cells. Biosci Rep. 1, 669-86.
Mueckler, M., Thorens, B., 2013. The SLC2 (GLUT) family of membrane transporters. Mol Aspects Med. 34, 121-38.
Okabe, T., Fujisawa, M., Takaku, F., 1984. Long-term cultivation and differentiation of human erythroleukemia cells in a protein-free chemically defined medium. Proc Natl Acad Sci USA. 81, 453-5.
Ozturk, S. S., Palsson, B. O., 1991. Effect of medium osmolarity on hybridoma growth, metabolism, and antibody production. Biotechnol Bioeng. 37, 989-93.
Scannell, J., Morgan, M. J., 1982. The regulation of carbohydrate metabolism in animal cells: isolation of starch- and maltose-utilizing variants. Biosci Rep. 2, 99-106.
Selvarasu, S., Ho, Y. S., Chong, W. P., Wong, N. S., Yusufi, F. N., Lee, Y. Y., Yap, M. G., Lee, D. Y., 2012. Combined in silico modeling and metabolomics analysis to characterize fed-batch CHO cell culture. Biotechnol Bioeng. 109, 1415-29.
Sinacore, M. S., Drapeau, D., Adamson, S. R., 2000. Adaptation of mammalian cells to growth in serum-free media. Mol Biotechnol. 15, 249-57.
Thorens, B., 1996. Glucose transporters in the regulation of intestinal, renal, and liver glucose fluxes. Am J Physiol. 270, G541-53.
Warburg, O., 1956. On the origin of cancer cells. Science. 123, 309-14.
Wong, D., Wong, K., Goh, L.-T., Heng, C., Yap, M., 2005. Impact of dynamic online fedbatch strategies on metabolism, productivity and N-glycosylation quality in CHO cell cultures. Biotechnol Bioeng. 89, 164-77.
Wood, R. E., Wirth, F. P., Jr., Morgan, H. E., 1968. Glucose permeability of lipid bilayer membranes. Biochim Biophys Acta. 163, 171-8.
Wright, E. M., 2013. Glucose transport families SLC5 and SLC50. Mol Aspects Med. 34, 183-96.
Wright, E. M., Loo, D. D., Panayotova-Heiermann, M., Lostao, M. P., Hirayama, B. H., Mackenzie, B., Boorer, K., Zampighi, G., 1994. 'Active' sugar transport in eukaryotes. J Exp Biol. 196, 197-212.

What is claimed is:

1. A method of extending cell culture viability of a mammalian cell, comprising: growing and culturing the mammalian cell in a serum-free cell culture medium, wherein the culture medium comprises maltose and glucose as sole carbohydrate sources, wherein the maltose is present at a concentration of between 0.5 g/litre to 40 g/litre, wherein the maltose and glucose results in extended cell culture viability, and wherein maximum viable cell density is increased by at least 4% as compared with glucose as the sole carbohydrate source.

2. The method of claim 1, wherein the serum-free cell culture medium is protein-free.

3. The method of claim 1, wherein the serum-free cell culture medium is a chemically defined medium.

4. The method of claim 1, wherein the serum-free cell culture medium is a protein-free chemically defined medium (PFCDM).

5. The method of claim 1, wherein the serum-free cell culture medium is further combined with a hydrolysate, an enzymatic digest or yeast cell extract.

6. The method of claim 1, wherein the serum-free cell culture medium is further combined with an ionic surfactant or a non-ionic surfactant.

7. The method of claim 1, wherein the serum-free cell culture medium further comprises an antibiotic agent, and wherein the antibiotic agent is selected from the group consisting of hygromycin B, puromycin, blasticidin, bleomycin sulfate, geneticin (G418), zeocin, amphotericin B, ampicillin, penicillin, chloramphenicol, gentamycin, kanamycin, neomycin, streptomycin, tetracycline, polymyxin B, actinomycin D, amikacin, bacitracin, carbenicillin, ceftazidime, coumermycin A1, D-cycloserine, cyclohexamide, dihydrostreptomycin sesquisulfate, kasugamycin, mycophenolic acid, nalidixic acid, nourseothricin sulfate, oxytetraclycline, paromomycin sulfate, phleomycin, mitomycin C ribostamycin, rifampicin, rifamycin, spectinomycin, tazobactam, thiostrepton, ticarcillin, and combinations thereof.

8. The method of claim 1, wherein glucose is present at a concentration of between 0.5 g/liter to 40 g/liter.

9. The method of claim 1, wherein the serum-free cell culture medium is in powdered or liquid form.

10. The method of claim 1, wherein the cell is able to metabolize the carbohydrate without requiring prior adaptation.

11. The method of claim 1, wherein the serum-free cell culture medium is used to grow and/or culture mammalian cells in a cell culture method selected from the group consisting of batch, fed-batch, continuous, and perfusion.

12. The method of claim 1, wherein the serum-free cell culture medium is used as a basal medium, a feed medium, and/or a perfusion medium.

13. The method of claim 1, wherein the serum-free cell culture medium comprises a higher concentration of maltose than glucose.

14. The method of claim 1, wherein the maltose is present at a concentration of about 20 g/litre.

15. The method of claim 1, wherein the mammalian cell is an antibody-producing cell.

* * * * *